United States Patent [19]
Ikeda et al.

[11] Patent Number: 5,693,748
[45] Date of Patent: Dec. 2, 1997

[54] HIGH MOLECULAR WEIGHT POLYIMIDOYLAMIDINE AND A POLYTRIAZINE DERIVED THEREFROM

[75] Inventors: Masanori Ikeda, Fuji; Atsushi Aoshima, Yokohama; Hiroyuki Fukui, Niiza, all of Japan

[73] Assignee: Asahi Kasei Kogyo Kabushiki Kaisha, Osaka, Japan

[21] Appl. No.: 334,314

[22] Filed: Nov. 2, 1994

Related U.S. Application Data

[62] Division of Ser. No. 178,615, Jan. 7, 1994, abandoned, which is a continuation of Ser. No. 737,477, Jul. 30, 1991, abandoned, which is a continuation-in-part of Ser. No. 455,325, Apr. 24, 1990, abandoned.

[30] Foreign Application Priority Data

Jul. 30, 1990 [JP] Japan ................... 2-199126

[51] Int. Cl.$^6$ .................. C08G 65/00; C08G 59/14; C08G 59/16
[52] U.S. Cl. .................. 528/421; 528/483; 528/492; 528/494
[58] Field of Search .................. 528/289, 421, 528/483, 492, 494

[56] References Cited

U.S. PATENT DOCUMENTS

| | | |
|---|---|---|
| 3,250,807 | 5/1966 | Fritz et al. . |
| 3,317,484 | 5/1967 | Fritz et al. . |
| 3,489,727 | 1/1970 | Dorfman et al. . |
| 3,660,315 | 5/1972 | Hill et al. . |
| 3,810,874 | 5/1974 | Mitsch et al. . |
| 3,845,051 | 10/1974 | Zollinger . |
| 4,102,872 | 7/1978 | Griffin . |
| 4,242,498 | 12/1980 | Frosch et al. . |
| 4,356,291 | 10/1982 | Darling . |
| 4,434,106 | 2/1984 | Rosser et al. . |

FOREIGN PATENT DOCUMENTS

| | | |
|---|---|---|
| 50-7054 | 3/1975 | Japan . |
| 62-120335 | 6/1987 | Japan . |
| 1341975 | 12/1973 | United Kingdom . |

OTHER PUBLICATIONS

English language abstract of Japanese Patent No. 62-120335.

English language abstract of Japanese Patent No. 50-7054.

"High Performance Perfluoroalkyl Ether Triazine Elastomers" by R.A. Korus, Industrial Engineering Chemistry, Product Research Development, 20, pp. 694–696 (1981).

"Perfluoroalkylene-Ether Triazine Elastomers", Journal of Polymer Science: Polymer Letters Edition, vol. 20, 467–472, (1982), Rosser et al.

"Polymers from Hexafluoropropylene Oxide (HFPO)" by J. T. Hill, J. Macromol. Sci.–Chem., A8(3), pp. 499–520 (1974).

"Successful Direct Fluorination of Oxygen–Containing Hydrocarbons" by J.L. Adcock et al, J. Org. Chem., vol. 40, No. 22, 1975.

P.J. Flory, "Principles of Polymer Chemistry" Cornell University Press, Ithaca, NY pp. 622–623 (1953).

"Polymer Molecular Weights, Part I", Techniques & Methods of Polymer Evaluation, vol. 4, Marcel Dekker, Inc., New York, pp. 6–7, (1975).

"Synthesis of Perfluoroalkylether Triazine Elastomers", Journal of Polymer Science, Polymer Letters Edition, vol. 18, 1980 (Rosser et al.), pp. 135–139.

*Primary Examiner*—Jeffrey C. Mullis
*Attorney, Agent, or Firm*—Birch, Stewart, Kolasch & Birch, LLP

[57] ABSTRACT

A high molecular weight polyimidoylamidine having an intrinsic viscosity of from 0.25 dl/g to 0.60 dl/g and a high molecular weight polytriazine derived therefrom having an intrinsic viscosity of from 0.25 dl/g to 0.65 dl/g are disclosed. A polyimidoylamidine having a molecular weight in a wide range, including high molecular weight, can advantageously be obtained by reacting a perfluoropolyether dinitrile with ammonia and reacting the resultant reaction product with a specific amount of a perfluoropolyether dinitrile. A terminal-stabilized polytriazine and its preparation methods are also disclosed. A polytrizine, which contains a nitrile group at side chains thereof and has an intrinsic viscosity within a specific range, is particularly suitable as a precursor of a perfluoroelastomer having excellent mechanical and chemical properties.

8 Claims, No Drawings

HIGH MOLECULAR WEIGHT POLYIMIDOYLAMIDINE AND A POLYTRIAZINE DERIVED THEREFROM

This application is a division of Ser. No. 08/178,615 filed Jan. 7, 1994 now abandoned which is a continuation of Ser. No. 07/737,477 filed Jul. 30, 1991 now abandoned which is a continuation-in-part of Ser. No. 07/455,325 filed Apr. 24, 1990 now abandoned.

BACKGROUND OF THE INVENTION

1. Field Of The Invention

The present invention relates to a high molecular weight polyimidoylamidine (hereinafter frequently referred to simply as "PIA") comprising a perfluoropolyether chain as a main chain and a polytriazine (hereinafter frequently referred to simply as "PTR") derived from the PIA.

More particularly, the present invention is concerned with a novel high molecular weight PIA having an intrinsic viscosity of from 0.12 to 0.60 dl/g and a method for preparing the same, a novel high molecular weight PTR derived from the high molecular weight PIA and a method for preparing the same, and new uses for the PIA and PTR.

The high molecular weight PIA per se according to the present invention is a useful polymer. Further, the high molecular weight PIA is also useful for preparing various high performance polymers therefrom utilizing the reactivity of the imidoylamidine group of the PIA. These polymers have various unique properties, which the conventional products derived from a low molecular weight PIA do not have, due to their high molecular weight characteristics. Therefore, these polymers are extremely useful materials for commercial use.

For example, various high molecular weight polytriazines having high stability can be easily obtained from the high molecular weight PIA of the present invention. Of these polytriazines, a polytriazine having a high molecular weight is a solid substance and, therefore, is particularly useful as a novel, chemically stable, structural material.

Further, a high molecular weight polytriazine shows sufficient viscosity even at a high temperature and, therefore, is useful as a viscosity modifier for a fluoro-oil and a fluorogrease each comprising a perfluoropolyether.

Furthermore, according to the present invention, it has been found that the polytriazine having an intrinsic viscosity within a specific range is advantageously useful as a lubricant usable under high temperature and/or high vacuum conditions, a lubricant for a magnetic recording material, or a highly stable, torque transmitting oil.

Moreover, according to the present invention, it has also been found that the polyimidoylamidine having an intrinsic viscosity within a specific range is advantageously useful as a lubricant for a magnetic recording material or a surface treating agent for a metallic or ceramic material.

It has also been found that a polytriazine, which contains nitrile group at side chains thereof and has an intrinsic viscosity within a specific range, is suitable as a precursor of a perfluoroelastomer having excellent mechanical and chemical properties.

2. Discussion of Related Art

A PIA is generally obtained by the reaction of a dinitrile having a perfluoropolyether chain as a main chain with ammonia. Although the mechanism of the reaction has not yet been elucidated in detail, it is believed that bivalent groups derived from the dinitrile are interbonded through an imidoylamidine group formed by reactions of following formulae (1) and (2):

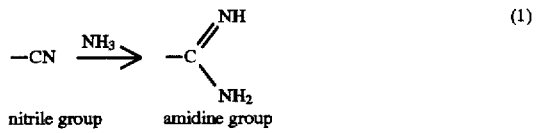

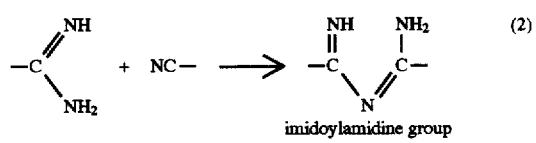

Heretofore, various methods for synthesizing PIA from a bifunctional perfluoropolyether have been reported. However, it has not yet been known how to synthesize a PIA having a weight average molecular weight of $3 \times 10^4$ or more, or having an intrinsic viscosity of 0.10 dl/g or more.

As a method for preparing a PIA having a perfluoropolyether chain, there are known, for example, a method described in U.S. Pat. No. 4,242,498 and Industrial Engineering Chemistry; Product Research Development, 20, p.694 (1981), in which $R_{fo}'(CN)_2$ (wherein $R_{fo}'$ is a bivalent perfluoropolyether chain, and this definition of $R_{fo}'$ applies to the subsequent formulae too) is reacted with ammonia while refluxing ammonia [formula (3)]:

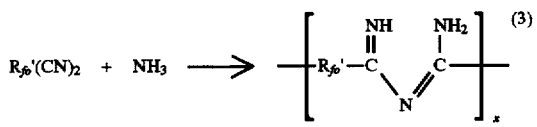

and a method described in U.S. Pat. No. 4,434,106 and Journal of Polymer Science; Polymer Letter Edition, 20, p.467 (1982), in which the molecular weight is successively increased by the reactions represented by following formulae (4), (5), (6) and (7):

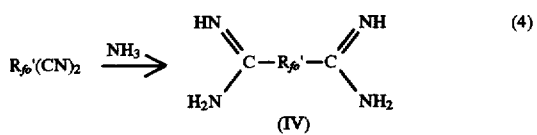

However, the method of formula (3) is disadvantageous in that the method is poor in reproducibility, and that, by this method, it is difficult to attain a high degree of polymerization. Therefore, this method is of no practical use. For example, a PIA prepared by the method of formula (3) is a viscous polymer having fluidity, which has an intrinsic viscosity of 0.095 dl/g at the highest. Further, a polytriazine obtained by treating such a PIA with trifluoroacetic anhydride is also a viscous polymer having fluidity, which has a maximum weight average molecular weight of only about $2.8 \times 10^4$ and exhibits an intrinsic viscosity of only 0.11 dl/g.

With respect to the method comprising the reactions of formulae (4), (5), (6) and (7), when it is intended to obtain a polymer of a high degree of polymerization, it is necessary to repeat the multi-stage reactions and, therefore, the operation is extremely troublesome. Moreover, when the preparation of a PIA having a higher degree of polymerization is intended by this method, various problems are encountered. That is, not only is it difficult to realize completely the same reaction as desired in each step, but also it is practically impossible to isolate and purify the desired polymer formed in each step. Therefore, this method is of no practical use.

In fact, a PIA which has a maximum molecular weight among the PIA's prepared by the above-mentioned method is a polymer of formula (VI) having a degree of polymerization represented by q of only 8 (molecular weight of about $1.4 \times 10^4$).

It is known that the PIA thus prepared can be converted into a polytriazine having a stable triazine ring by the ring closure reaction with an acid anhydride or an acid halide, which reaction is represented by following formula (8):

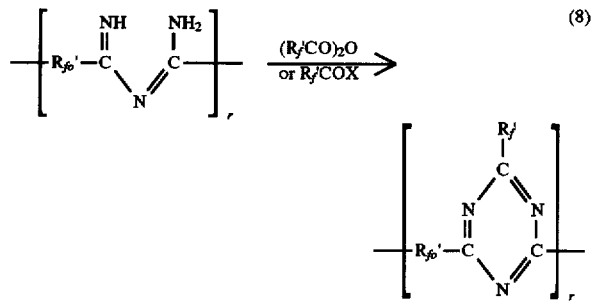

wherein $R_f'$ represents a perfluoroalkyl chain or a perfluoroether chain, and X represents a fluorine atom, a chlorine atom or a bromine atom.

However, a polytriazine (PTR) derived from the conventionally obtained low molecular weight, perfluoropolyether chain-containing PIA having an intrinsic viscosity of less than 0.10 dl/g is a viscous polymeric substance having fluidity due to its low molecular weight and, therefore, such a polytriazine is limited in utility. For this reason, any practical use has not been found for such a polytriazine.

As mentioned above, the operation of the conventional method for the synthesis of a perfluoropolyether chain-containing PIA is troublesome. Further, the PIA produced by the method has a low molecular weight and, therefore, the use thereof as a polymer material is limited.

SUMMARY OF THE INVENTION

The present inventors have made extensive and intensive studies with a view toward developing a practical method for preparing a high molecular weight, perfluoropolyether chain-containing PIA. As a result, it has been found that a high molecular weight PIA, which has heretofore not been obtained, can be obtained by a specific method.

From the high molecular weight PIA, a high molecular weight PTR can be synthesized by simple operation. It has also been found that the high molecular weight PTR has various excellent properties which the conventional low molecular weight PTR do not have and, therefore, it is extremely useful, for example, as a viscosity modifier for a fluoro-oil and a fluoro-grease, and the like.

The present invention has been completed based on these novel findings.

DETAIL DESCRIPTION OF THE INVENTION

Accordingly, in one aspect of the present invention, there is provided a polyimidoylamidine comprising recurring units of the following formula:

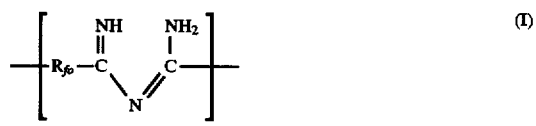

wherein $R_{fo}$ is a bivalent perfluoropolyether chain represented by the following formula:

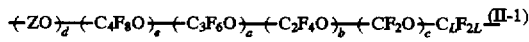

in which Z is a perfluoroalkylene group having from 2 to 20 carbon atoms which is unsubstituted or substituted, or a bivalent perfluoroether chain having from 4 to 25 carbon atoms which is unsubstituted or substituted, a, b, c and e are each 0 or a positive integer where $2 \leq a+b+c+e \leq 300$, d is 0 or 1, and L is 1, 2 or 3 and in which the arrangement of (ZO), $(C_4F_8O)$, $(C_3F_6O)$, $(C_2F_4O)$ and $(CF_2O)$ units is arbitrarily selected.

The bivalent chain (II-1) has a number average molecular weight of from $1 \times 10^3$ to $5 \times 10^4$. The units of formula (I) are the same or different. The polyimidoylamidine has an intrinsic viscosity of from 0.12 to 0.60 dl/g.

In another aspect of the present invention, there is provided a polytriazine comprising recurring units of the following formula:

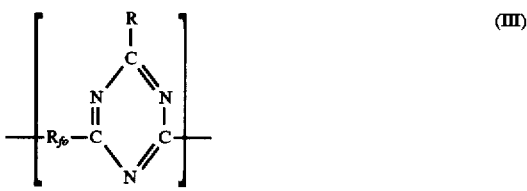

wherein R is a perfluoroalkyl group having from 1 to 15 carbon atoms which is unsubstituted or substituted or a perfluoroether group having from 2 to 100 carbon atoms which is unsubstituted or substituted, and $R_{fo}$ is a bivalent perfluoropolyether chain represented by the following formula:

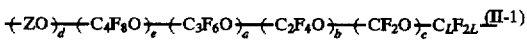

in which Z is a perfluoroalkylene group having from 2 to 20 carbon atoms which is unsubstituted or substituted, or a bivalent perfluoroether residue having from 4 to 25 carbon atoms which is unsubstituted or substituted, a, b, c and e are each 0 or a positive integer where $2 \leq a+b+c+e \leq 300$, d is 0 or 1, and L is 1, 2 or 3 and in which the arrangement of (ZO), $(C_4F_8O)$, $(C_3F_6O)$, $(C_2F_4O)$ and $(CF_2O)$ units is arbitrarily selected.

The bivalent chain (II-1) has a number average molecular weight of from $1 \times 10^3$ to $5 \times 10^4$. The units of formula (III) are the same or different. The polytriazine has an intrinsic viscosity of from 0.15 to 0.65 dl/g.

In a further aspect of the present invention, there is provided a method for preparing a polyimidoylamidine comprising recurring units of the following formula:

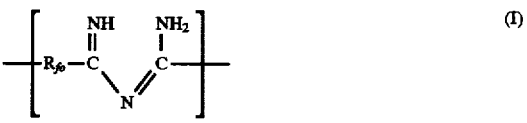

wherein $R_{fo}$ is a bivalent perfluoropolyether chain represented by the following formula:

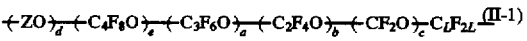

in which Z is a perfluoroalkylene group having from 2 to 20 carbon atoms which is unsubstituted or substituted, or a bivalent perfluoroether residue having from 4 to 25 carbon atoms which is unsubstituted or substituted, a, b, c and e are each 0 or a positive integer where $2 \leq a+b+c+e \leq 300$, d is 0 or 1, and L is 1, 2 or 3 and in which the arrangement of (ZO), ($C_4F_8O$), ($C_3F_6O$), ($C_2F_4O$) and ($CF_2O$) units is arbitrarily selected, where the bivalent chain (II-1) has a number average molecular weight of from $1\times10^3$ to $5\times10^4$ and wherein units of formula (I) are the same or different.

The method comprises:

(a) reacting a perfluoropolyethehr chian-containing dinitrile (α) represented by the following formula:

 (II)

wherein $R_{fc}$ is as defined above, the dinitrile (α) having a number average molecular weight of from about $1\times10^3$ to about $5\times10^4$ and a bifunctionality of at least 95 mole %, with ammonia in a molar ratio of the ammonia to the dinitrile (α) of at least 5, and (b) reacting the resultant reaction mixture with a perfluoropolyether chain-containing dinitrile (β) represented by the same formula as formula (II), the dinitrile (β) having a number average molecular weight of from about $1\times10^3$ to about $5\times10^4$ and a bifunctionality of at least 95 mole % and being employed in a molar ratio of from 0.60 to 0.99 relative to the dinitrile (α), wherein the dinitriles (α) and (β) are the same or different.

Hereinbelow, the present invention will be explained in detail.

As mentioned above, $R_{fc}$ of the bifunctional perfluoropolyether chain-containing dinitrile of formula (II), $R_{fc}$($CN)_2$, is as defined for formula (I), that is, $R_{fc}$ is represented by the formula (II-1):

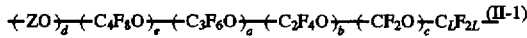 (II-1)

In formula (II-1), Z is a perfluoroalkylene group having from 2 to 20 carbon atoms, preferably from 3 to 10 carbon atoms, which is unsubstituted or substituted, or a bivalent perfluoroether residue having from 4 to 25 carbon atoms, preferably from 4 to 10 carbon atoms, which is unsubstituted or substituted, a, b, c and e are each 0 or a positive integer where $2 \leq a+b+c+e \leq 300$, d is 0 or 1, and L is 1, 2 or 3.

The structure, number average molecular weight, etc. of the bifunctional dinitrile, $R_{fc}(CN)_2$, can be easily determined by $^{19}$F-NMR spectrometry.

The number average molecular weight of the bifunctional dinitrile of formula (II) or the $R_{fc}$ moiety of the dinitrile is generally 1,000 or more, preferably 1,500 or more, most preferably 2,000 or more. Further, when a dinitrile of formula (II) having a high bifunctionality is used, it is preferred that the dinitrile of formula (II) have a number average molecular weight of 3,500 or more. As described later in detail, the mole percent of bifunctional dinitrile relative to the total number of moles of the bifunctional dinitrile and the monofunctional dinitrile present in the crude bifunctional dinitrile is herein defined simply as "bifunctionality".

When a dinitrile of formula (II) having a number average molecular weight of less then 1,000, it is difficult to obtain the desired high molecular weight PIA. The reason for this has not yet been elucidated.

The upper limit of the number average molecular weight of the dinitrile of formula (II) is not specifically restricted. However, when two high a number average molecular weight is intended, it is difficult to obtain a dinitrile, $R_{fc}$($CN)_2$, having a high bifunctionality. From a viewpoint of ease in production of a high bifunctionality dinitrile, the number average molecular weight of the dinitrile of formula (II), $R_{fc}(CN)_2$, is not greater than $5\times10^4$ preferably not greater than $3\times10^4$ more preferably not greater than $1.5\times10^4$, most preferably not greater than $1.2\times10^4$.

Accordingly, the total value of a, b and c of formula (II-1), although it varies depending on the number average molecular weight of Z of formula (II-1), is, on one hand, at least 2, preferably at least 4, most preferably at least 5 and, on the other hand, not greater than 300, preferably not greater than 150, most preferably not greater than 70.

In formula (II-1), the ($C_3F_6O$) unit embraces a

unit,

unit, and a ($CF_2CF_2CF_2O$) unit, the ($C_2F_4O$) unit embraces a

unit and a ($CF_2CF_2O$) unit, and the ($C_4F_8O$) unit embraces a ($CF_2CF_2CF_2CF_2O$) unit,

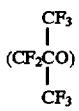

unit,

unit, and units of analogous structures. Further, the arrangement of (ZO), ($C_4F_8O$), ($C_3F_6O$), ($C_2F_4O$) and ($CF_2O$) unit in formula (II-1) is not limited to that shown in formula (II-1), but these units can be arranged in arbitrary order.

In formula (II-1), the $C_LF_{2L}$ unit embraces a $CF_2$ unit, a $CF_2CF_2$ unit, a

unit, a $CF_2CF_2CF_2$ unit, a

unit and units of analogous structures.

Bifunctional dinitrile $R_{fc}(CN)_2$ [formula (II)] which is used in the method of the present invention for preparing a polyimidoylamidine can be synthesized by various methods.

Examples of commercially advantageous methods for producing a bifunctional dinitrile, $R_{fc}(CN)_2$, include:

(1) a method in which hexafluoropropylene oxide (hereinafter referred to simply as "HFPO") is used as a starting material, and (2) a method in which various reactions for the synthesis of a perfluoropolyether are utilized.

Examples of methods (1) and (2) mentioned above are described below in detail, but the method for the synthesis of a dinitrile, $R_{fo}(CN)_2$, is not limited thereto.

(1) Method in which hexafluoropropylene oxide is used as a starting material:

$R_{fo}(CN)_2$ can be obtained from HFPO by various methods. Generally, there may be used either Method a') in which a bifunctional HFPO oligomer synthesized using a bifunctional polymerization initiator, is used as a starting material, or Method b') in which a bifunctional HFPO oligomer containing an ester group and an acid fluoride group (or a —$CF_2OM$ group where M represents an alkali metal atom), which has been synthesized using a monofunctional polymerization initiator containing an ester group, is used as a starting material.

Illustratively stated, oligomer dinitrile $R_{fo}(CN)_2$ [formula (II)] is synthesized, as shown in the following synthetic example, by converting to amide groups the terminal groups of a bifunctional HFPO oligomer obtained by the above-mentioned Method a') or Method b') to prepare an $R_{fo}(CONH_2)_2$, followed by dehydration using diphospharus pentaoxide.

The synthesis example can be illustrated as follows:

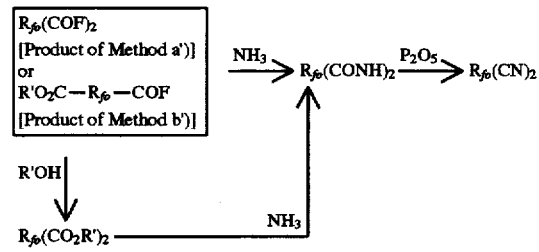

(R': a lower alkyl group)

Method a') and Method b') are explained below in detail.

When $R_{fo}(CN)_2$ is synthesized by either Method a') or Method b'), $R_{fo}$ is a bivalent residue (VIII-1) or (VIII-2) of a bifunctional hexafluoropropylene oxide oligomer, represented by the following formula:

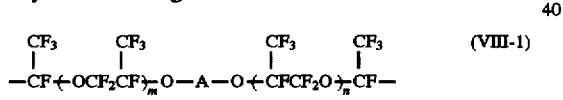

or

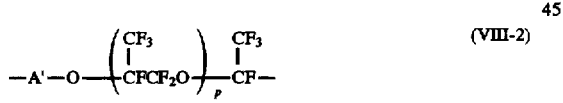

in which A is a perfluoroalkylene group having from 2 to 20 carbon atoms which is unsubstituted or substituted, or a bivalent perfluoroether residue having from 4 to 25 carbon atoms which is unsubstituted or substituted, A' is a perfluoroalkylene group having from 1 to 19 carbon atoms which are unsubstituted or substituted, or a bivalent perfluoroether residue having from 3 to 24 carbon atoms which is unsubstituted or substituted, m and n are each a positive integer, preferably an integer where $4 \leq m+n \leq 300$, and p is an integer, preferably from 4 to 300.

The bivalent residue (VIII-1) or (VIII-2) has a number average molecular weight of from $1 \times 10^3$ to $5 \times 10^4$.

a') Method in which an HFPO oligomer obtained using a bifunctional polymerization initiator is used as a starting material.

A bifunctional HFPO oligomer can be produced by the polymerization of HFPO using a bifunctional polymerization initiator.

For example, the bifunctional HFPO oligomer may be produced by a method in which reaction products of various fluorine-containing dicarboxylic fluorides with an alkali metal fluoride, such as cesium fluoride, are used as polymerization initiators, as described in, for example, Japanese Patent Application Publication Specification No. 53-5360, Japanese Patent Application Laid-Open Specification No. 47-6994, Japanese Patent Application Laid-Open Specification No. 57-175185 and U.S. Pat. No. 3,250,807.

The fluorine-containing dicarboxylic fluorides which are used for producing an HFPO polymerization initiator is represented by the following formula (IX):

wherein Z represents a perfluoroalkylene group which is unsubstituted or substituted, a bivalent perfluoroether residue which is unsubstituted or substituted, or a bond.

Examples of the above-mentioned fluorine-containing dicarboxylic fluorides include dicarboxylic fluorides represented by formulae:

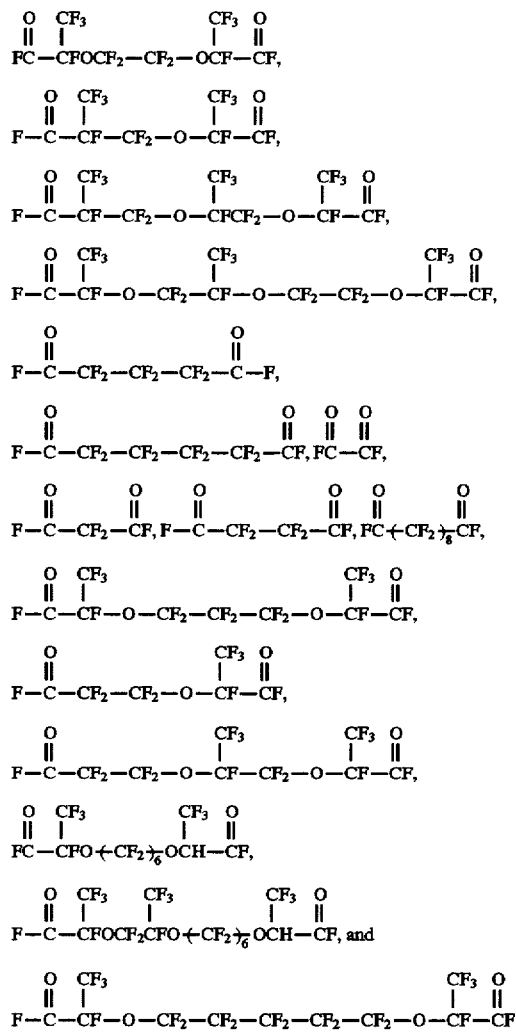

When the dicarboxylic fluoride represented by formula (IX) is reacted with, for example, cesium fluoride, a polymerization initiator species represented by the following formula (X):

CsOCF₂—Z—CF₂OCs     (X)

is formed. Species (X) is then reacted with HFPO to form a bifunctional HFPO oligomer represented by the following formula (XI):

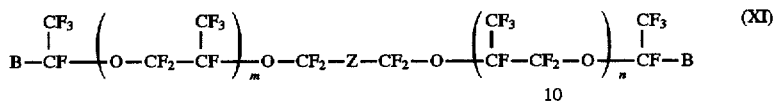
(XI)

wherein B is

or —CF₂OCs, m and n are each a positive integer, and —CF₂ZCF₂— in formula (XI) corresponds to —A— in formula (VIII-1).

The terminals of the oligomer represented by formula (XI) is in the equilibrium state as represented by following formula:

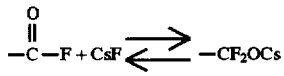

Therefore, B can assume either

or —CF₂OCs.

When a perfluoroketone is reacted with an alkali metal fluoride, such as cesium fluoride, the reaction proceeds in the following manner:

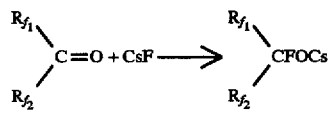

wherein $R_{f_1}$ and $R_{f_2}$ are each a perfluoroalkyl group, to thereby form a compound having the alkoxide structure shown above, which structure is similar to that of species (X). Such a compound is useful as a polymerization initiator. Therefore, the use of either a perfluorodiketone, or a substance of a perfluoro structure which contains an acid fluoride group and a ketone group, in combination with an alkali metal fluoride, can also be used as a bifunctional polymerization initiator for HFPO.

b') Method in which an HFPO oligomer obtained using a monofunctional polymerization initiator con- taining an ester group is used as a starting material.

A bifunctional HFPO oligomer containing an ester group and an acid fluoride group (or —CF₂OM group, where M represents an alkali metal atom) is synthesized in substantially the same manner as in the HFPO polymerization method described in Method a') except that a reaction product of an ester group-containing acid fluoride represented by formula (XXII) with an alkali metal fluoride, such as cesium fluoride,

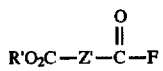
(XXII)

wherein R' is an alkyl group having from 1 to 10 carbon atoms and Z' has the same meaning as Z in formula (IX) is used as a polymerization initiator. This synthesis can be illustrated as follows:

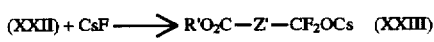

(XXIV)

wherein p is an integer of 4 to 300, B has the same meaning as B in formula (XI), and —Z'—CF₂— corresponds to A' in formula (VIII-2).

Examples of ester group-containing acid fluorides represented by the above-mentioned formula (XXII) include the following compounds:

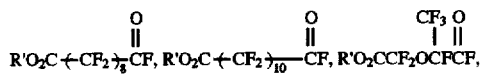

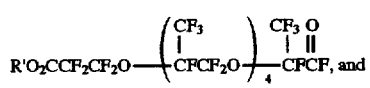

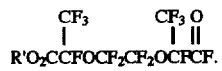

The carbon number of R' is not specifically limited. Generally, an alkyl group having from 1 to 10 carbon atoms is used as R'. Particularly, a lower alkyl group, such as a methyl group, an ethyl group or a propyl group, is preferred from the standpoint of ease in synthesis and operation.

As mentioned above, A in formula (VIII-1) and A' in formula (VIII-2) each represent a bifunctional polymerization initiator residue of the bifunctional HFPO oligomer, and are each a perfluoroalkylene group or a bivalent perfluoroether residue, or a bivalent group or residue derived therefrom in which the fluorine atom is substituted with an inert substituent group, such as a hydrogen atom, a bromine atom or an iodine atom, in a ratio of not greater than 30% of the total number of fluorine atoms of the unsubstituted bivalent group or residue.

In the present invention, when A is a perfluoroalkylene group, the number of carbon atoms of the group is from 2 to 20, preferably from 2 to 12, more preferably from 2 to 8. When A' is a perfluoroalkylene group, the number of carbon atoms of the group is from 1 to 19, preferably from 2 to 11, more preferably from 2 to 7. When A is a bivalent perfluoroether residue, the number of carbon atoms of the residue is from 4 to 25, preferably from 4 to 15. When A' is a bivalent perfluoroether residue, the number of carbon atoms of the residue is from 3 to 24, preferably from 3 to 14. The upper limit of the number of carbon atoms of each of A and A' is not particularly limited. From the standpoint of ease in synthesis and purification of A and A', the availability of a starting material and ease in handling, the bivalent group or residue having carbon atoms within the above-mentioned range is generally used, but an employable bivalent group or residue is not limited thereto. A and A' each may also be a bivalent perfluoropolyether residue containing a plurality of ether structures, wherein the number of ether structures is up to 10.

The terminal groups of a bifunctional HFPO oligomer represented by formula (XI) or formula (XXIV) are easily converted to nitrile groups via or not via ester groups.

The conversion of the terminal functional groups may be conducted by a method described in, for example, Japanese Patent Application Publication specification No. 53-5360. That is, an oligomer having ester groups at both terminals can be formed by reacting the terminal groups of the oligomer of formula (XI) or formula (XXIV) with an alcohol.

An oligomer having nitrile groups as terminal groups can be obtained as follows. An amide is synthesized by the reaction of the terminals of the oligomer of formula (XI) or formula (XXIV) with ammonia, or by the reaction of the oligomer having ester groups at both terminals, which is obtained by the above-mentioned method, with ammonia. The amide is then subjected to dehydration from the amide group using a dehydrating agent, such as diphosphorus pentaoxide.

As mentioned above, an HFPO oligomer represented by $R_{fo}(CN)_2$ [formula (II)] is derived from a bifunctional HFPO oligomer. When the bifunctional oligomer is synthesized by the polymerization of HFPO, by-production of a monofunctional oligomer represented by formula (XIII):

(XIII)

wherein, B' is

or —$CF_2OM$ (M is an alkali metal atom), and l is a positive integer, occurs in most cases.

Examples of alkali metals represented by M in the present invention include lithium, sodium, potassium, cesium and rubidium. Of these, preferred are potassium, cesium and rubidium, and more preferred is cesium.

When $R_{fo}(CN)_2$ to be used in the method according to the present invention contains a monofunctional oligomer having a nitrile group at its only one terminal, which is derived from the above-mentioned monofunctional oligomer, the polymerization for the PIA formation is likely to be terminated by the reaction with the monofunctional oligomer. Therefore, when the amount of the monofunctional oligomer in $R_{fo}(CN)_2$ is large, a high molecular weight PIA cannot be obtained.

Accordingly, with respect to the $R_{fo}(CN)_2$ to be used in the present invention, it is preferred that the molar ratio of the amount of the $R_{fo}(CN)_2$ relative to the total amount of the $R_{fo}(CN)_2$ and the monofunctional oligomer, that is, the bifunctionality of the $R_{fo}(CN)_2$, be at least 95%.

When it is intended to synthesize a PIA having particularly high degree of polymerization, there is used an $R_{fo}(CN)_2$ having a bifunctionality of at least 98%, preferably 99% or more, and more preferably 99.5% or more.

Synthesis of a high purity bifunctional HFPO oligomer, which is a starting material for a high purity HFPO dinitrile, is feasible by employing the following high precision polymerization method. That is, when the polymerization of HFPO is conducted under strictly controlled conditions using reaction materials, namely, an HFPO monomer, a bifunctional polymerization initiator, an ester group-containing monofunctional polymerization initiator and a solvent which have all been purified to an extremely high extent by a special process, the formation of the monofunctional oligomer is suppressed, so that preparation of a high purity bifunctional HFPO oligomer can be attained to some extent.

However, the above method has disadvantages in that the production cost becomes high and the by-production of a small amount of a monofunctional oligomer is generally inevitable. Therefore, it is preferable if a bifunctional HFPO oligomer having a high purity can be obtained by a simple operation from a crude bifunctional HFPO oligomer containing a small amount of a monofunctional oligomer, which can be easily synthesized.

Therefore, the present inventors have made extensive and intensive studies with a view toward obtaining a bifunctional HFPO oligomer having a high purity by a simple operation from a crude bifunctional HFPO oligomer containing a monofunctional oligomer. As a result, it has unexpectedly been found that when a crude bifunctional HFPO oligomer having a specific structure is subjected to distillation under specific conditions, a bifunctional HFPO oligomer having a high purity can be easily obtained.

That is, the present inventors have discovered the following method for obtaining a bifunctional hexafluoropropylene oxide oligomer dinitrile having a high bifunctional group purity. The method comprises:

(1) polymerizing hexafluoropropylene oxide by the use of a bifunctional polymerization initiator represented by the following formula:

MO—A"—OM wherein A" is a perfluoroalkylene group having from 2 to 20 carbon atoms which is unsubstituted or substituted, or a bivalent perfluoroether residue having from 4 to 25 carbon atoms which is unsubstituted or substituted, and M is an alkali metal atom, to obtain a mixture of a bifunctional hexafluoropropylene oxide oligomer having a number average molecular weight of from 1,000 to 15,000 and represented by the following formula:

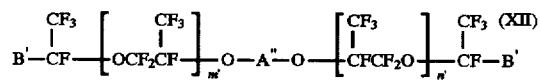

(XII)

wherein A" is as defined above, m' and n' are each a positive integer, and B' is

or —$CF_2OM$ where M is as defined above and a monofunctional hexafluoropropylene oligomer having a number average molecular weight of from 500 to 15,000 and represented by the following formula:

wherein B' is as defined above and l is a positive integer, (2) converting the terminal groups of the bifunctional and monofunctional hexafluoropropylene oxide oligomers to ester groups or nitrile groups, (3) subjecting the resultant mixture to distillation under reduced pressure at a temperature of from 80° to 450° C., so that 1 to 35% by weight of the resultant mixture is removed as an initial stage distillation fraction, wherein when the terminal groups of the bifunctional and monofunctional hexafluoropropylene oxide oligomers are converted to ester groups in step (2), the ester groups are converted to nitrile groups prior to step (3) or subsequent to step (3).

The HFPO oligomer dinitrile having a high purity obtained by the above-mentioned method can advantageously be used as a starting material for producing the above-mentioned polyimidoylamidine of formula (I) wherein $R_{f_0}$ is a bivalent residue represented by formula (VIII-1).

The method for preparing the bifunctional HFPO oligomer represented by formula (XII) and the method for modifying the terminals thereof are the same as the method for preparing the bifunctional HFPO oligomer represented by formula (XI) and the method for modifying the terminals thereof, respectively.

The method for obtaining or purifying the above-mentioned bifunctional HFPO oligomer dinitrile having a high purity can be used not only for obtaining the bifunctional HFPO oligomer dinitrile, but also for purifying a bifunctional HFPO oligomer having a relatively high molecular weight which is useful as a starting material for various functional macromolecular materials.

The molecular weight of the bifunctional HFPO oligomer used in the above-mentioned purification method is not particularly limited, as long as the monofunctional HFPO oligomer, which is contained as an impurity, can be removed by distillation at a temperature of 450° C. or lower under reduced pressure. Generally, a bifunctional HFPO oligomer having a molecular weight of from 1,000 to 15,000, preferably from 2,000 to 12,000, more preferably from 3,500 to 10,000 in terms of a number average molecular weight is used in the purification method of the present invention.

When the molecular weight of the bifunctional HFPO oligomer is too small, a polymer prepared therefrom cannot effectively exhibit the properties of the HFPO polymer chain and, it is generally difficult to completely remove the monofunctional oligomer.

When the molecular weight of the bifunctional HFPO oligomer is too large, the amount of by-produced monofunctional HFPO oligomer is remarkably increased, so that it becomes difficult to obtain a high purity bifunctional HFPO oligomer from the mixture. Moreover, when the molecular weight is too large, it is necessary to conduct distillation by heating at a high temperature, leading to a disadvantage such that the polymer is likely to be decomposed.

In the purification method, the terminal groups of both the bifunctional HFPO oligomer represented by formula (XII) and the simultaneously by-produced monofunctional HFPO oligomer represented by formula (XIII) are converted to ester groups or nitrile groups in step (2), and then, the oligomers are separated by distillation in step (3). For obtaining a starting material for preparing the above-mentioned polyimidoylamidine, when the terminal groups of the above-mentioned bifunctional and monofunctional hexafluoropropylene oxide oligomers are converted to ester groups in step. (2), the ester groups are converted to nitrile groups prior to step (3) or subsequent to step (3).

There is no particular limitation with respect to the type of alcohol to be used in the above-mentioned conversion to ester groups according to the present invention as long as the molecular weight of an alcohol is not too large and a produced ester is stable under distillation conditions. Generally, a lower hydrocarbon alcohol, such as methyl alcohol or ethyl alcohol, may be used. If desired, a hydrocarbon alcohol having a larger molecular weight, a fluorine-containing alcohol, thiol or the like may also be used.

The bifunctional HFPO oligomer of formula (XII) and the by-produced monofunctional HFPO oligomer of formula (XIII) to be used in the above-mentioned purification method, both of which have specific molecular weights and both of which have their terminal groups converted to ester groups or nitrile groups, surprisingly exhibit high distillation-separable properties and, therefore, they can be separated from each other by means of a distillation equipment of simple structure stably and effectively without causing the bifunctional HFPO oligomer to be decomposed.

With respect to the distillation equipment to be used in the purification method, when the oligomers have relatively low molecular weights, a conventional packed column type or a tray column type distillation equipment can be used, but generally, it is advantageous to use a simple distillation equipment or a thin film type distillation equipment (or a molecular distillation equipment), such as Kugelrohr type or Arthur type distillation equipment. It is known that the simple distillation equipment or the thin film type distillation equipment (or the molecular distillation equipment) has a separating ability which corresponds to the number of theoretical plates of only about one. However, in the purification method of the present invention, using such a distillation equipment, the bifunctional HFPO oligomer can, unexpectedly, be effectively separated from the monofunctional HFPO oligomer which is expected to exhibit properties extremely similar to those of the bifunctional HFPO oligomer, which is surprising.

The distillation is generally conducted under reduced pressure. Although the degree of reduced pressure is varied depending on the molecular weight of the oligomer and the distillation temperature, the distillation is generally conducted under a pressure within the range of from 400 to $10^{-7}$ mmHg or from 100 to $10^{-6}$ mmHg, preferably within the range of from 30 to $10^{-5}$ mmHg. The higher the degree of vacuum, the lower the distillation temperature becomes, which is advantageous. However, it is difficult to employ an extremely high degree of vacuum when the distillation is conducted on a commercial scale. When the degree of vacuum is too low, the distillation temperature becomes high so that the decomposition of the oligomer takes place, which is disadvantageous.

The heating temperature for distillation is varied depending on the molecular weight of the oligomer and the degree of reduced pressure. The heating temperature which is generally used is within the range of from 80° to 450° C., preferably from 100° to 400° C. When the heating temperature is too high, the decomposition of the oligomer takes place. When the heating temperature is too low, the distillation of the oligomer becomes difficult.

In this purification method, when a crude bifunctional oligomer is subjected to distillation, a distillate which contains a large amount of monofunctional oligomer as an impurity is first obtained, so that a bifunctional oligomer which almost does not contain the monofunctional oligomer can be obtained as a residue. The bifunctional oligomer remaining as the residue may be subjected to further distillation for purification. Alternatively, the bifunctional oligomer as such may be used as a starting material for synthesizing a polymer without being subjected to further distillation.

The mole percent of bifunctional oligomer relative to the total number of moles of the bifunctional oligomer and the monofunctional oligomer present in the crude bifunctional oligomer is herein defined simply as "bifunctionality". The bifunctionality and the number average molecular weight $\overline{MW}n$ can easily be calculated from $^{19}$F-NMR spectrum data of the oligomer according to the method described in Journal of Macromolecular Science-Chemistry A8(3), 499, (1974).

With respect to the determination of the bifunctionality and the $\overline{MW}n$ from $^{19}$F-NMR spectrum, the higher the resolution of $^{19}$F-NMR spectrum, the more accurately the determination can be conducted.

In the present invention, a high resolution nuclear magnetic resonance absorption spectrometer JNM-FX-600 manufactured by JEOL Ltd., Japan ($^{19}$F observation frequency: 187.736 MHz) is used. By means of this equipment, the bifunctionality and the $\overline{MW}n$ can be determined with sufficient accuracy.

In the distillation operation in the above-mentioned purification method, the amount of initial stage distillation fraction required for removing the monofunctional oligomer depends upon the bifunctionality of the crude bifunctional oligomer and the desired bifunctionality of the purified bifunctional oligomer. In general, however, when distillation is conducted until 1 to 35% by weight, preferably 3 to 35% by weight, more preferably 5 to 30% by weight, most preferably 5 to 25% by weight based on the amount of the crude bifunctional oligomer is removed as an initial stage distillation fraction, a bifunctional HFPO oligomer having a high purity can be obtained.

The bifunctionality of the high purity bifunctional oligomer obtained by the above-mentioned purification method varies depending on the bifunctionality of the crude bifunctional oligomer used and the amount of the initial stage distillation fraction removed. However, the bifunctionality of at least 95% by mole can easily be obtained. It is also possible to obtain a bifunctional oligomer having a bifunctionality of 98% by mole or more, 99% by mole or more, and more preferably 99.5% by mole or more.

As mentioned above, an $R_{fo}(CN)_2$ having a high bifunctionality can be obtained by the high precision polymerization method or by the above-mentioned purification method in which a monofunctional oligomer is removed by distillation. However, in some cases, a very small amount of a polar impurity is present in the $R_{fo}(CN)_2$.

Examples of polar impurities include polar substances, such as water, an inorganic acid, an inorganic salt, an oligomer having a carboxyl group or a carboxylate group as a terminal group, an oligomer having an amide group as a terminal group, and a colorant. It is preferred that these polar impurities be removed because the polar impurities inhibit the formation of the high molecular weight polyimidoylamidine of the present invention.

As an advantageous method for removing these polar materials, there may be mentioned a method in which the bifunctional oligomer (ester or nitrile) obtained by the high precision polymerization method, the crude bifunctional oligomer (before being subjected to purification by distillation according to the above-mentioned purification method for the bifunctional oligomer), or the distillation-purified bifunctional oligomer, is treated with an adsorbent for a polar material, such as silica gel, activated alumina, silica alumina, activated clay, molecular sieve, zeolite and active carbon. For conducting the treatment, several methods can be employed. Generally, a column treatment method in which an oligomer solution is passed through a column packed with an adsorbent is advantageously used. As a solvent for the oligomer, various fluoride-containing solvents may be used. For example, there may be used a chlorofluorocarbon type solvent, such as 1,1,2-trichloro-1,2,2-trifluoroethane; a perfluorocarbon type solvent, such as perfluorohexane or perfluorooctane; a fluorine-containing ether type solvent, such as 2H-tetradecafluoro-5-(trifluoromethyl)-3,6-dioxanonane or perfluoro-2-butyltetrahydrofuran; or a perfluoroamine type solvent, such as perfluorotributylamine. Of these, the chlorofluorocarbon type solvent is advantageous from the viewpoint of cost and availability. On the other hand, the perfluorocarbon type solvent, the perfluoroamine type solvent and the fluorine-containing ether type solvent are advantageous in that a high degree of purification can be attained.

(2) Method in which various reactions for the synthesis of a perfluoropolyether are utilized:

In addition to Method (1), various methods can be used for the synthesis of $R_{fo}(CN)_2$. For example, $R_{fo}(CN)_2$ can be synthesized by converting the terminal groups of a bifunctional oligomer obtained by various reactions shown below.

That is, a perfluoropolyether having acid fluoride groups as terminal groups is prepared by various methods. The terminal acid fluoride groups are converted, directly or via ester groups, to amido groups. The amido groups are then converted to nitrile groups.

In Japanese Patent Application Publication No. 50-7054, Japanese Patent Application Laid-Open Specification No. 60-34924 and U.S. Pat. No. 3,845,051, a process represented by the following reaction formulae is disclosed:

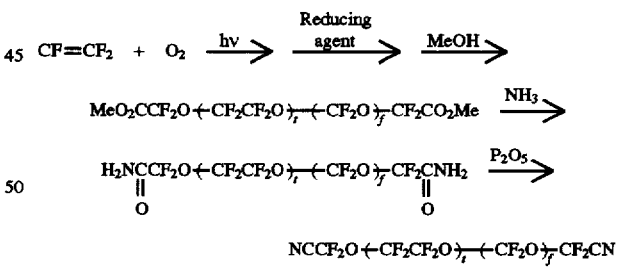

wherein Me is a methyl group, and t and f are each a positive integer.

In U.S. Pat. No. 3,317,484, a process represented by the following reaction formula is disclosed:

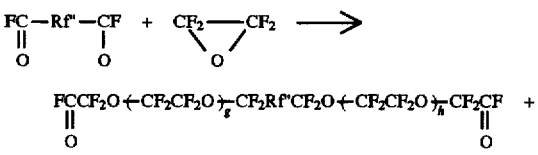

-continued

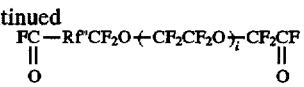

wherein g, h and i are each a positive integer, and $R_{f'}$ is a perfluoroalkyene group having 0 to 10 carbon atoms.

In Journal of Organic Chemistry, Volume 40, pp. 3271 (1975), a process represented by the following reaction formula is disclosed:

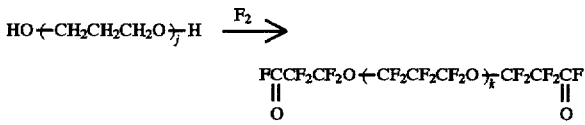

In Japanese Patent Application Laid-Open specification No. 62-120335, a process for obtaining an oligomer having —$OCF_2COF$ or —$OCF_2CF_2COF$ groups as terminal groups is disclosed in which a perfluoropolyether comprising recurring units represented by —($CF_2CF_2O$)—, —($CF_2CF_2CF_2O$)— and the like is decomposed by heating in the presence of a catalyst.

Following are illustrative examples of bifunctional perfluoropolyether dinitriles represented by $R_{fc}(CN)_2$, which, however, should not be construed to be limiting $R_{fc}(CN)_2$ to be used in the method of the present invention.

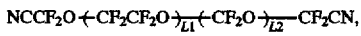

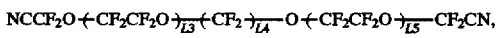

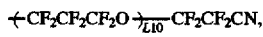

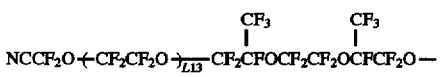

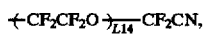

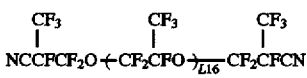

wherein L1 to L16 are each a positive integer.

Impurities which are contained in the synthesiged $R_{fc}$ $(CN)_2$ or the raw materials therefor, can be effectively removed by distillation, or treatment with an adsorbent for a polar substance, such as silica gel, activated alumina or activated carbon.

As is apparent from the above, a bifunctional perfluoropolyether dinitrile, $R_{fc}(CN)_2$, to be used in the method of the present invention can be synthesized by various processes. The synthesis method is not limited to the above-mentioned synthesis examples. Other combinations of units corresponding to (ZO), ($C_4F_8O$), ($C_3F_6O$), ($C_2F_4O$), ($CF_2O$) and $C_lF_{2l}$ units, which have different structures from those exemplified above, can be used. Further, it should be noted that $R_{fc}(CN)_2$ in which some of the units are replaced by other units of homologous structure, can also be used, exerting the same effect aimed at by the present invention.

Preparation of a PIA of the present invention is conducted by the following steps (a) and (b) using as a starting material an $R_{fc}(CN)_2$ having a number average molecular weight of from about $1\times10^3$ to about $5\times10^4$ and having a bifunctionality of at least 95 mole %.

(a) Reaction between $R_{fc}(CN)_2$ and ammonia:

An $R_{fc}(CN)_2$ is reacted with ammonia in a molar ratio of the ammonia to the $R_{fc}(CN)_2$ of at least 5, to thereby obtain a reaction product comprised mainly of an oligomer having terminal amidine groups converted from the nitrile groups.

The $^{19}$F-NMR spectrum of the product shows that by the reaction, functional groups other than amidine groups are also produced in a small amount. However, the product as such may be used for the subsequent reaction with an $R_{fc}(CN)_2$ in step (b). Conversion of nitrile groups to amidine groups can easily be confirmed by an infrared adsorption spectroscopy. That is, the nitrile groups of the $R_{fc}(CN)_2$ exhibit a characteristic absorption at about 2,260 cm$^{-1}$ to about 2,275 cm$^{-1}$, whereas the amidine groups exhibit a characteristic absorption at 1,695 cm$^{-1}$ to 1,700 cm$^{-1}$. Therefore, the degree of advance of the reaction may readily be confirmed by observing the change in the peak intensity. In step (a), the reaction is advanced until the nitrile groups are not detected.

The reaction temperature is generally from –80° C. to 70° C., preferably from –50° C. to 50° C. When the reaction temperature is too low, a sufficient reaction rate cannot be obtained. On the other hand, when the reaction temperature is too high, the reaction operation becomes difficult because the vapor pressure of ammonia becomes high.

The reaction time is generally from 1 minute to 100 hours, but the reaction may be conducted for a period of more than 100 hours.

The $R_{fc}(CN)_2$ is reacted with ammonia in a molar ratio of the ammonia to the $R_{fc}(CN)_2$ of at least 5, preferably in a molar ratio as large as at least 10.

When the molar ratio of the ammonia to the $R_{fc}(CN)_2$ is less than 5, the yield of the amidine-forming reaction becomes low, which is disadvantageous.

The reaction between the $R_{fc}(CN)_2$ and ammonia may be conducted in various types of atmosphere. For example, the $R_{fc}(CN)_2$ may be reacted with a liquefied ammonia or a gaseous ammonia. However, when the gaseous ammonia is used, it is preferred that the partial pressure of the ammonia be as high as possible, for example, the reaction be conducted under a super-atmospheric pressure.

Moreover, a method in which the $R_{fc}(CN)_2$ is reacted with ammonia dissolved in a solvent is suitable for the present invention. With respect to the solvent to be used, there is no particular limitation, as long as the solvent is inert to ammonia used and amidine produced. A solvent for which $R_{fc}(CN)_2$ and ammonia have a high solubility is preferred from the standpoint of ease in the reaction operation.

Examples of solvents to be used in the present invention include an ether type solvent, such as diethyl ether and tetrahydrofuran; a hydrocarbon type solvent, such as cyclohexane, octane and toluene; a chlorine type solvent, such as dichloroethane and dichloromethane, and a fluorine type solvent containing a fluorine atom. The fluorine type solvent or a mixed solvent containing the fluorine type solvent is particularly preferred because ammonia and $R_{fc}$ $(CN)_2$ have a high solubility for such a solvent.

Examples of fluorine type solvents to be used for the reaction include a chlorofluorocarbon type solvent, such as 1,1,2-trichloro-1,2,2-trifluoroethane (hereinafter referred to simply as "F-113"); a perfluorocarbon type solvent, such as perfluorohexane or perfluorooctane; a fluorine-containing ether type solvent, such as perfluoro-2-butyl-tetrahydrofuran or 2H-tetradecafluoro-5-(trifluoromethyl)-3,6-dioxanonane; and a perfluoroamine type solvent, such as perfluorotributylamine.

When the reaction between $R_{fo}(CN)_2$ and ammonia is conducted at the temperature of lower than −33° C., which corresponds to the boiling point of ammonia, a pressure vessel is not particularly required. However, when the reaction temperature is −33° C. or higher, it is preferred to use a pressure vessel. On the other hand, when a fluorine type solvent is used, the pressure vessel is not necessarily used even at a reaction temperature of −33° C. or higher. However, even in such a case, it is preferred that the reaction be conducted in a pressure vessel under high ammonia concentration conditions.

(b) Reaction between the reaction product in step (a) and $R_{fo}(CN)_2$:

The present inventors have studied in detail with respect to the reaction conditions with a view toward obtaining a high molecular weight PIA by the reaction between the reaction product in step (a) and an $R_{fo}(CN)_2$. As a result, it has unexpectedly been found that when the reaction product obtained in step (a) is reacted with an $R_{fo}(CN)_2$ in a molar ratio of from 0.60 to 0.99 relative to the $R_{fo}(CN)_2$ used in step (a), a PIA having a molecular weight in the wide range of from a relatively low molecular weight to a high molecular weight, can be produced with high reproducibility. When the $R_{fo}(CN)_2$'s to be used in steps (a) and (b) are designated "$R_{fo}(CN)_2$ ($\alpha$)" and "$R_{fo}(CN)_2$ ($\beta$)", respectively, $R_{fo}(CN)_2$ ($\alpha$) and $R_{fo}(CN)_2$ ($\beta$) may be the same or different.

As described above, side reaction products having groups other than amidine groups are contained in the reaction product in step (a). In spite of this, a high molecular weight PIA is produced when the reaction is conducted in the above-mentioned molar ratio, which is unexpected. As described above, this has for the first time been attained by reacting the product which has been obtained by reacting an $R_{fo}(CN)_2$ having a specific molecular weight and a specific purity or bifunctionality with ammonia under specific conditions, with an $R_{fo}(CN)_2$ in a specific molar ratio.

In other words, the present invention has for the first time become feasible, based on the successful development of purification technique and accurate analysis of $R_{fo}(CN)_2$ and the detailed investigation of the reaction conditions.

In the conventional synthesis methods of PIA, not only the bifunctionality of $R_{fo}(CN)_2$ to be used for the reaction but also the molar ratio of the ammonia-treated $R_{fo}(CN)_2$ to an untreated $R_{fo}(CN)_2$ have not been taken into account at all.

The reaction for forming a PIA of the present invention can be conducted in the presence or absence of a solvent.

There is no particular limitation with respect to the solvent to be used in the reaction, as long as the solvent is an inert solvent capable of dissolving a product of the reaction between $R_{fo}(CN)_2$ and ammonia as well as the $R_{fo}(CN)_2$.

Examples of solvents include a chlorofluorocarbon type solvent, such as 1,1,2-trichloro-1,2,2-trifluoroethane; a perfluorocarbon type solvent, such as perfluorohexane or perfluorooctane; a fluorine-containing ether type solvent, such as perfluoro-2-butyl-tetrahydrofuran or 2H-tetradecafluoro-5-(trifluoromethyl)-3,6-dioxanonane; and a perfluoroamine type solvent, such as perfluorotributylamine.

The reaction temperature of the reaction for forming PIA in step (b) is generally from −80° to 90° C., preferably from −50° to 70° C. When the reaction temperature is too low, a sufficient reaction rate cannot be obtained. On the other hand, when the reaction temperature is too high, not only decomposition of amidine groups but also triazine ring forming reaction is likely to occur, which is disadvantageous.

The degree of advance of the PIA forming reaction in step (b) can be determined by measuring the infrared absorption spectrum of a reaction product or by determining the viscosity thereof.

That is, in the infrared adsorption spectroscopy, the imidoilamidine groups exhibit characteristic absorption peaks at 1,600 cm$^{-1}$ and 1,660 cm$^{-1}$. From the ratio of the intensities of these characteristic absorption peaks to the intensity of a peak at about 2,260 cm$^{-1}$ to about 2,275 cm$^{-1}$ attributable to nitrile groups or the intensity of a peak at about 1,695 cm$^{-1}$ to about 1,700 cm$^{-1}$ attributable to amidine groups, the degree of polymerization can be determined.

By the PIA forming reaction in step (b), a desired high molecular weight compound can generally be obtained within a period of time of from 1 minute to 100 hours, but the reaction time may be more than 100 hours.

Moreover, the degree of polymerization can be determined by the viscosity of a reaction product. R. W. Rosser et al. have reported that there is a linear relationship between the viscosity of the PIA and the weight average molecular weight of the polytriazine, which is prepared from the PIA, as measured by gel permeation chromatography [Journal of Polymer Science, Polymer Letters Edition, 18, p135 (1980), Industrial Engineering Chemistry, Product Research Development, 20, p694 (1981) and the specification of U.S. Pat. No. 4,242,498]. These reports of Rosser et al. show that 0.095 dl/g, which is a maximum value among the intrinsic viscosity values of the PIA's as measured in F-113 at 30° C. corresponds to the weight average molecular weight of $2.8 \times 10^4$ of a polytriazine converted from the PIA by trifluoroacetic anhydride.

These values of intrinsic viscosity and weight average molecular weight of PIA are maximum among those which have heretofore been reported in literatures and patents, insofar as the present inventors have known.

In the preparation method of PIA according to the present invention, when the number of moles of $R_{fo}(CN)_2$ used for the reaction with ammonia is expressed by $M_1$ and the number of moles of $R_{fo}(CN)_2$ to be reacted with the reaction product of the above reaction with ammonia is expressed by $M_2$, the molecular weight of PIA formed depends upon the ratio of $M_2/M_1$. In the method of the present invention, when the ratio of $M_2/M_1$ is selected within the range of from 0.60 to 0.99, preferably from 0.70 to 0.98, more preferably from 0.75 to 0.96, there can be easily obtained not only a PIA having an intrinsic viscosity of 0.02 dl/g or more, for example, 0.05 dl/g, as measured in F-113 at 30° C., which has conventionally been obtained, but also a PIA having an intrinsic viscosity as high as from 0.10 to 0.30 dl/g or from 0.12 to 0.40 dl/g as measured in F-113 at 30° C., which has never conventionally been obtained.

When the molecular weight becomes particularly high, the solubility in F-113 becomes low at a temperature of 30° C. However, a PIA having an intrinsic viscosity of from 0.30 to 0.60 dl/g as measured at 35° or 40° C. in perfluorohexane, perfluorooxtane or F-113 can be obtained. In addition, a super high molecular weight PIA having an intrinsic viscosity of from 0.40 to 0.60 dl/g, or 0.60 dl/g or more as measured in 2H-tetradecafluoro-5-(trifluoromethyl)-3,6-dioxanonane at 50° C. can also be obtained.

Although the appearance of the perfluoropolyether type PIA obtained by the method of the present invention depends on the structure of the main chain to some extent, the PIA of the present invention generally exhibits different appearances according to the molecular weight thereof, as follows.

A PIA having an intrinsic viscosity of from 0.02 to 0.10 dl/g is a viscous polymer having fluidity. A PIA having an intrinsic viscosity of from 0.10 to 0.15 dl/g, more particularly from 0.12 to 0.15 dl/g is a waxy substance. A PIA having an intrinsic viscosity of from 0.15 to 0.25 dl/g is a semisolid substance having a slight elasticity. A PIA having an intrinsic viscosity of greater than 0.25 dl/g is an elastic, solid.

A PIA having an intrinsic viscosity of 0.05 dl/g corresponds to that having a viscosity average molecular weight ($\overline{Mv}$) of $3.5 \times 10^4$. A PIA having an intrinsic viscosity of 0.10 dl/g corresponds to that having an $\overline{Mv}$ of $1 \times 10^5$. A PIA having an intrinsic viscosity of 0.15 dl/g corresponds to that having an $\overline{Mv}$ of $2 \times 10^5$. A PIA having an intrinsic viscosity of 0.30 dl/g corresponds to that having an $\overline{Mv}$ of about $8 \times 10^5$.

As described above, the PIA having a maximum molecular weight among the perfluoropolyether type PIA's which have heretofore been reported is a viscous polymer having fluidity, which has an intrinsic viscosity of only 0.095 dl/g. Therefore, the high molecular weight PIA prepared by the method of the present invention, which has an intrinsic viscosity of 0.10 dl/g or more, preferably 0.12 dl/g or more and which is a waxy substance, a semisolid substance having a slight elasticity or an elastic, solid substance, is a novel, high molecular weight perfluoropolyether material and has for the first time been prepared by the method of the present invention.

As described above, in the PIA synthesis reaction according to the present invention, the molecular weight of the PIA can be regulated by changing the molecular weight and purity of the $R_{fe}(CN)_2$, the reaction conditions for the reaction between $R_{fe}(CN)_2$ and ammonia, and the ratio of $M_2/M_1$. Particularly, by changing the ratio of $M_2/M_1$, a PIA having a desired molecular weight within the wide range can be prepared with high reproducibility. This characteristic is extremely important from a commercial point of view.

On the other hand, with respect to the conventional methods for preparing the perfluoropolyether type PIA, it is noted that even by either a method in which the $R_{fe}(CN)_2$ is reacted with ammonia gas or a method in which the molecular weight is successively increased, a PIA having a high molecular weight cannot be obtained. In addition, the reproducibility is poor and the operation is troublesome. Therefore, the conventional methods are not advantageous from the economic point of view.

Therefore, the method of the present invention for preparing a perfluoropolyether type PIA is not only advantageous for preparing a high molecular weight PIA which has not conventionally been obtained, but also extremely important from a commercial point of view for preparing PIA's having desired various molecular weights by an easy operation with high reproducibility.

The novel high molecular weight PIA of the present invention thus prepared can be converted to a high molecular weight polytriazine, which comprises recurring units of formula (III), by reacting the PIA with various acylating agents in the same manner as in the reaction of the conventional PIA having a relatively low molecular weight.

As the acylating agent to be used in the present invention, there may be mentioned an acylating agent capable of forming a triazine ring to which a perfluoroalkylene group $R_{f_1}$ or a perfluoroether group $R_{fe_1}$ is bonded. Examples of acylating agents include an acid fluoride, such as $R_{f_1}$ and $R_{fe_1}COF$; an acid chloride, such as $R_{f_1}$ and $R_{fe_1}COCl$; an acid anhydride, such as $(R_{f_1}CO)_2O$ and $R_{fe_1}CO)_2O$; and a cyclic perfluoro acid anhydride. However, the acylating agent is not limited to the above-mentioned examples.

Herein, $R_{f_1}$ is a perfluoroalkyl group having from 1 to 15 carbon atoms, preferably from 1 to 11 carbon atoms, more preferably from 1 to 7 carbon atoms, and $R_{fe_1}$ is a perfluoroether group having from 2 to 100 carbon atoms, preferably from 2 to 40 carbon atoms, more preferably 2 to 20 carbon atoms. The perfluoroether group mentioned herein is defined as including a perfluoropolyether group. $R_{f_1}$ and $R_{fe_1}$ correspond to R of formula (III). The fluorine atoms of each of R, $R_{f_1}$ and $R_{fe_1}$ may be substituted with a substituent group which is inert under the conditions for the formation of a triazine ring, such as a hydrogen atom, a chlorine atom, a bromine atom, an iodine atom, a nitrile group, a carboxyl group and an ester group, in a ratio of not greater than 35%, preferably not greater than 30%, of the total number of fluorine atoms of the unsubstituted R, $R_{f_1}$ or $R_{fe_1}$. When a fluorine type cyclic acid anhydride is employed as an acylating agent, substituent R containing a carboxyl group is formed.

Accordingly, in still a further aspect of the present invention, there is provided a method for preparing a polytriazine comprising recurring units of formula (III) and having an intrinsic viscosity of from 0.15 to 0.65 dl/g. This method comprises reacting a polyimidoylamidine comprising recurring units of formula (I) and having an intrinsic viscosity of from 0.12 to 0.60 dl/g, with an acylating agent containing or capable of forming substituent R, where R has the same meaning as defined for formula (III).

Examples of acylating agents to be used in the method of the present invention include those represented by the formulae:

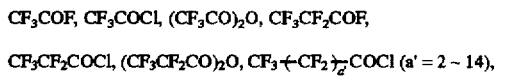

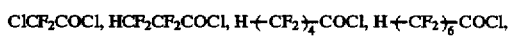

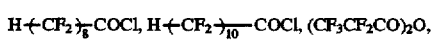

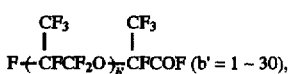

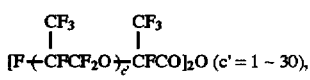

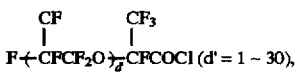

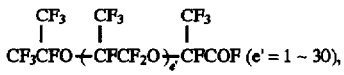

-continued
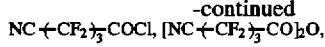

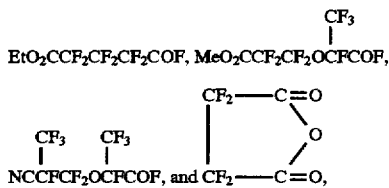

but acylating agents usable in the present invention are not limited to these examples.

Conversion of the PIA to a polytriazine by means of these acylating agents may be conducted under the same conditions as in the case of the conversion of the conventional low molecular weight PIA to a polytriazine corresponding thereto. For example, as described in the Journal of Polymer Science, Polymer Letters Edition, Vol. 20, p.467 (1982); U.S. Pat. No. 4,242,498; and the Journal of Polymer Science, Polymer Letters Edition, Vol. 18, p.135 (1980), a polytriazine can readily be obtained by reacting a PIA with an acylating agent in a fluorine-containing solvent. Alternatively, the reaction may be effected in the absence of a solvent.

The acylating agent is used in a molar ratio of at least 2, preferably 4 or more relative to the imidoylamidine group of the polyimidoylamidine. There is no particular upper limit for the molar ratio of the acylating agent relative to the imidoylamidine group, but, in general, the acylating agent is used in a molar ratio of not greater than about 100 from the viewpoint of cost and ease in operation.

The perfluoropolyether type polytriazine obtained as described above exhibits a sharp characteristic band at about 1,550 cm$^{-1}$ to about 1,560 cm$^{-1}$ in an infrared absorption spectrum.

The intrinsic viscosity of the polytriazine depends on the types of the PIA and acylating agent employed, and there can be attained intrinsic viscosities in a wide range. That is, polytriazines having intrinsic viscosities in a wide range of from the range of 0.02 dl/g–0.12 dl/g (relatively low molecular weight polytriazine) through the range of 0.12 dl/g–0.65 dl/g or 0.15 dl/g–0.65 dl/g, or higher (high molecular weight polytriazine) can be obtained. The measurement of the intrinsic viscosity of the polytriazine is conducted under the same conditions as in the case of the PIA.

When the molecular weight of $R_{fo_1}$ or $R_{f_1}$ is 1000 or less, the relationship between the intrinsic viscosity and the viscosity average molecular weight of the PTR is almost the same as the relationship between the intrinsic viscosity and the viscosity average molecular weight of the PIA.

Unless otherwise specified, with respect to the intrinsic viscosities of the PIA and PTR, a value which is less than 0.20 is obtained by the measurement in F-113 at 30° C., and a value which is 0.20 or more is obtained by the measurement in perfluorohexane at 40° C.

The intrinsic viscosities of the PIA and PTR can be measured by means of Cannon-Ubbelohde viscometer, Ostwald viscometer or the like.

When the terminal groups of the PIA comprising recurring units of formula (I) are represented by X and Y, the whole structure of the PIA is represented by formula (XIV):

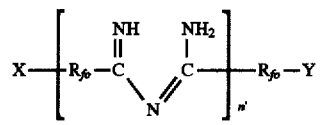 (XIV)

wherein $R_{fo}$ has the same meaning as defined for formula (I), X and Y each represent a terminal group and n' is a positive integer.

The structures of the terminal groups X and Y depend mainly on the reaction conditions for the synthesis of the PIA and the bifunctionality of $R_{fo}(CN)_2$.

It is believed that when the purity of $R_{fo}(CN)_2$ is high and the synthesis of the PIA is conducted under completely dry conditions, X and Y are each comprised mainly of a nitrile group (—CN) or an amidine group

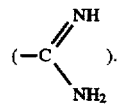

Whether X and Y comprise only nitrile groups or only amidine groups, or a mixture thereof, depends on the reaction conditions for the synthesis of the PIA. For example, the structures of X and Y depend on the reaction conditions and the proportions of the feedstocks employed in step (a) and step (b) of the present method for preparing a PIA. In general, when the amount of $R_{fo}(CN)_2$ used in step (b) is larger than that of the $R_{fo}(CN)_2$ which is necessary for forming a PIA having a maximum molecular weight, the amount of the nitrile group-terminated structure becomes larger than that of the amidine group-terminated structure, whereas when the amount of $R_{fo}(CN)_2$ used in step (b) is smaller, the amount of the amidine group-terminated structure becomes larger than that of the nitrile group-terminated structure.

Further, it is believed that when $R_{fo}(CN)_2$ contains a monofunctional oligomer represented by formula (XV):

G—CN  (XV)

wherein G is a monovalent perfluoropolyether chain, for example,

where m' represents a positive integer, all or a portion of each of groups X and Y are comprised of a terminal structure represented by formula (XVI):

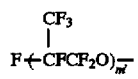 (XVI)

wherein G and m' are as defined above.

Further, it is believed that when the reaction system for the synthesis of the PIA contains an HFPO oligomer containing polar terminal groups, such as an amide group, a carboxyl group and a carboxylate group, or low molecular weight polar substances, such as water and an inorganic acid, a polar group-terminated structure which is inert to the polymerization growth of the PIA is formed by the reaction of the oligomer containing polar terminal groups and the low molecular weight polar substances with the terminal nitrile groups and terminal amidine groups of the PIA.

As examples of the terminal structure of the PTR which is formed by the above-mentioned reaction of the PIA with an acylating agent, there may be mentioned ① a nitrile group-terminated structure, ② a polar group-terminated structure formed by the reaction of terminal amidine groups with an acylating agent or by the reaction of terminal amidine groups with an acidic substance derived from the acylating agent, ③ a terminal structure represented by formula (XVII):

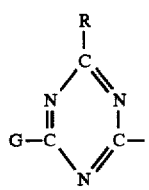

(XVII)

wherein G is a monovalent perfluoropolyether chain, for example,

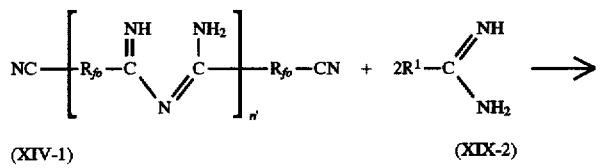

(XIV-1)                    (XIX-2)

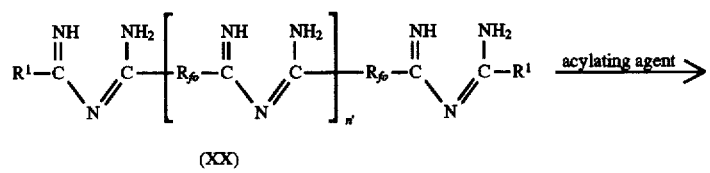

(XX)

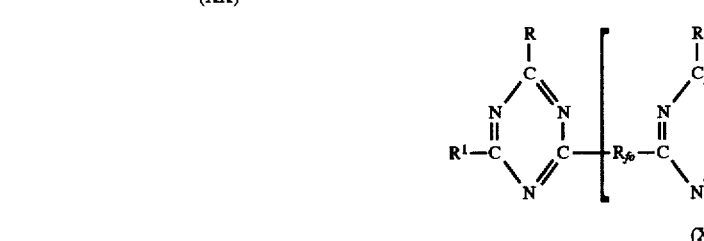

(XXI)

CF₃
|
F+CFCF₂O)ₘ⁻ where m' represents a positive integer and R has the same meaning as defined for formula (III), and ④ a polar group-terminated structure derived from polar impurities.

When the synthesis of the PIA and in turn the synthesis of PTR are conducted under dry conditions using R_fo(CN)₂ having a high purity, the formation of terminal structures ③ and ④ mentioned above in the resultant PTR can be suppressed. However, according to the methods for preparing a PIA and a PTR according to the present invention, it is impossible to avoid the formation of terminal groups ① and/or ② in the resultant PTR.

The PTR of the present invention generally has a high heat stability, so that not only is there almost no decomposition of the PTR at a temperature of up to about 300° C. even in air, but also the PTR is stable at a temperature of up to 350° C. in an inert gas atmosphere. However, at a temperature of 310° C. or more in air, a slight weight decrease is observed, which suggests that the PTR is partially decomposed. The reason for the occurrence of heat decomposition is believed to reside in that the heat stability of the above-mentioned terminal structures ① and ② is unsatisfactory and, hence, heat decomposition advances from the terminals. Therefore, the present inventors have made studies with a view toward developing a method for imparting the terminals with high stability.

As a result, it has been found that the terminal structure of the PTR can be stabilized and improved in heat resistance by employing process (A) and/or process (B).

Process (A)

The case where there is employed, as a starting material, the PIA (XIV-1) which corresponds to formula (XIV) where X and Y are each CN:

Both terminal nitrile groups are converted to imidoylamidine groups by the following reaction, and then reacted with an acylating agent, to thereby obtain a stabilized PTR.

wherein R of formula (XXI) has the same meaning as defined for formula (III).

The amidine compound of formula (XIX-2) employed in the above reaction can readily be obtained by the following reaction:

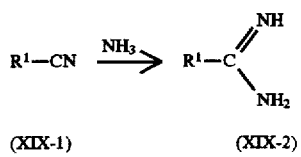

(XIX-1)                    (XIX-2)

wherein R¹ of each of formulae (XIX-1) and (XIX-2) has the same meaning as defined for formula (III), exclusive of those which are substituted with a nitrile group, an ester group or a carboxyl group.

The polyimidoylamidine of formula (XIV-1) having both terminal groups comprised of nitrile groups, which is the starting material of the above reaction, can be obtained by increasing the amount of $R_{fo}(CN)_2$ to be used in step (b) of the synthesis method of the PIA.

In process (A), the amidine compound of formula (XIX-2) is used in a molar ratio of at least 2, preferably 4 or more relative to the polyimidoylamidine of formula (XIV-1). There is no particular upper limit for the molar ratio of the amidine compound, but, in general, the amidine compound is used in a molar ratio of not greater than about 100 from the viewpoint of cost and ease in operation.

The amount of the acylating agent is as described before.

Process (B)

The case where there is employed, as a starting material, the PIA (XIV-2) which corresponds to formula (XIV) where X and Y are each an amidine group:

Both terminal amidine groups are converted to imidoylamidine groups by the following reaction, and then reacted with an acylating agent, to thereby obtain a stabilized PTR.

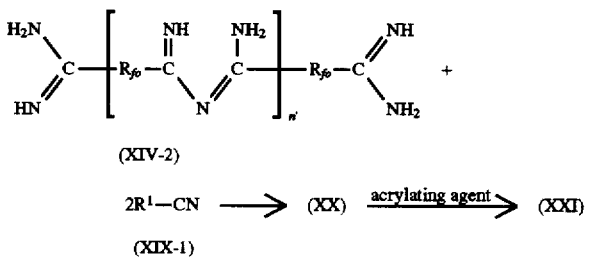

PIA (i) of formula (XIV-2) can be obtained by decreasing the amount of $R_{fo}(CN)_2$ to be used in step (b) of the method for the PIA synthesis, or by treating, with ammonia, PIA (ii) of formula (XIV-1) which corresponds to formula (XIV) where X and Y are each a nitrile group or PIA (iii) which corresponds to formula (XIV) where X and Y are respectively a nitrile group and an amidine group, or a mixture (iii) of PIA's (ii) and (iii).

In process (B), the nitrile compound of formula (XIX-1) is used in a molar ratio of at least 2, preferably 4 or more relative to the polyimidoylamidine. There is no particular upper limit for the molar ratio of the nitrile compound relative to the polyimidoylamidine, but, in general, the nitrile compound is used in a molar ratio of not greater than about 100 from the viewpoint of cost and ease in operation.

The amount of the acylating agent is as described above.

With respect to the terminal-stabilized PTR (XXI) obtained by process (A) or process (B) described above, when R and R' contain no polar groups, substantially no decomposition is observed at a temperature of up to about 370° C. in an inert gas atmosphere, and substantially no decomposition is observed at a temperature of up to about 340° C. even in air.

Beside process (A) and process (B) being useful as a process for the synthesis of a terminal-stabilized PTR, for example, of formula (XXI), there can be mentioned a process in which, as a starting material, a mixture of $R_{fo}(CN)_2$ with a small amount of a monofunctional oligomer, for example, of formula (XV) or with a small amount of a monofunctional nitrile compound, for example, of formula (XIX-1), is used to thereby intentionally produce inert terminals, and the resultant PIA is then converted to a PTR having inert terminals, for example, of formula (XXI).

Also, it is possible to convert a nitrile group-terminated PTR to a terminal-stabilized PTR in the same manner as in the process for the terminal stabilization by the conversion of the nitrile group-terminated PIA (XIX-1) to (XXI).

The viscosity of the terminal-stabilized PTR represented by formula (XXI) is not significantly different from that of the terminal-nonstabilized PTR, except in the case where terminal group $R^1$ has a particularly large molecular weight. The viscosity of the terminal-stabilized PTR is generally from 0.02 dl/g to 0.65, preferably 0.05 dl/g to 0.65 dl/g, more preferably 0.15 dl/g to 0.65 dl/g.

The present inventors have discovered various novel applications for PIA and PTR. Hereinbelow, those applications will be described.

That is, a PTR having an intrinsic viscosity of from 0.02 dl/g to 0.25 dl/g is useful as a lubricant usable under high temperature and/or high vacuum conditions, and a PTR having an intrinsic viscosity of from 0.05 dl/g to 0.65 dl/g is useful as a viscosity modifier for a fluoro-oil, such as a perfluoropolyether, and a fluoro-grease. Further, a PTR having an intrinsic viscosity of from 0.02 dl/g to 0.65 dl/g and a PIA having an intrinsic viscosity of from 0.02 dl/g to 0.60 dl/g are useful as a lubricant for a magnetic recording material, and a PTR having an intrinsic viscosity of from 0.05 dl/g to 0.25 dl/g is useful as a torque transmitting oil, and a PIA having an intrinsic viscosity of from 0.02 dl/g to 0.60 dl/g is useful as a surface treating agent for metallic and ceramic materials.

Each of the applications will be described hereinbelow in greater detail.

(Application-1) Lubricant usable under high temperature and/or high vacuum conditions In the case of various types of perfluoropolyethers which have conventionally been put into practical use, such as Krytox (manufactured by E. I. Du Pont De NEMOURS AND COMPANY, U.S.A.), Fomblin (manufactured by Montefluos Co., Italy) and Demnum (manufactured by Daikin Kogyo Co., Ltd., Japan), the number average molecular weight is at most about 8,000 to 13,000, and it has been difficult to produce a polymer advantageously having a molecular weight larger than the above-mentioned range on a commercial scale.

Such perfluoropolyethers are low in molecular weight and, hence, the viscosities thereof become extremely low when heated to about 150° C. to 200° C., especially to about 250° C. or to about 300° C. Therefore, there has been a problem such that when the perfluoropolyethers are employed as a lubricant in a single form or in a composite form (grease form) in which a thickener is combined, the viscosity becomes too low at high temperatures, so that the lubricating properties are drastically lowered.

Further, with respect to a grease in which the low molecular weight perfluoropolyethers are used as a base oil, a phenomenon such that the base oil and the thickener are separated from each other due to the low viscosity of the base oil, that is, the so-called oil separation, markedly occurs at high temperatures, such as 150° C. or higher, especially 200° C. or higher. For this reason as well, the use of the perfluoropolyethers at high temperatures has been restricted.

Further, since the perfluoropolyethers are low in molecular weight, most of these exhibit a vapor pressure as high as $10^{-9}$ torr or more at about room temperature, especially a vapor pressure as high as $10^{-4}$ torr or more at 150° C. or higher. Therefore, there has been a problem such that when the perfluoropolyethers are employed as a lubricant under high temperature and/or high vacuum conditions, irrespective of whether they are used in a single form or in a composite form (grease form) combined with various thickeners, not only is there a loss of the perfluoropolyethers by evaporation but there is also likely to occur a pollution of the environment by the evaporated perfluoropolyethers.

Perfluoropolyethers having a high molecular weight are considered as being those which would exhibit a satisfactory viscosity and a low vapor pressure even at high temperatures and, therefore, could be suitably used under high temperature and/or high vacuum conditions. However, perfluoropolyethers which have such properties and which can readily be synthesized, have not been obtainable by conventional means.

The high molecular weight PTR which can readily be prepared from the high molecular weight PIA synthesized by the method of the present invention, is satisfactory in lubricating properties and heat stability and, in addition, exhibits a satisfactory viscosity and a low vapor pressure even at a high temperature of 200° C. or more or about 300° C. by virtue of the high molecular weight thereof. Therefore, the high molecular weight PTR is useful as a lubricant for use under high temperature conditions, such as 200° C. or more, particularly about 300° C.

With respect to the perfluoropolyether type PTR which is useful as a lubricant for use under high temperature and/or high vacuum conditions, the intrinsic viscosity is generally in the range of from 0.02 dl/g to 0.25 dl/g, preferably in the range of from 0.10 dl/g to 0.25 dl/g, more preferably in the range of 0.15 dl/g to 0.25 dl/g.

When the intrinsic viscosity is lower than 0.02 dl/g, the PTR is not suitable as a lubricant for use under high temperature and/or high vacuum conditions since not only does the viscosity become low but also the vapor pressure will become high, under high temperature conditions. On the other hand, when the intrinsic viscosity is higher than 0.25 dl/g, disadvantageously, the use of the PTR is extremely restricted due to its high viscosity.

The PTR of the present invention may be blended with additives, such as a thickener and an extreme pressure additive, in a proportion of up to 40% by weight, based on the weight of the PTR.

(Application-2) Viscosity modifier for a perfluoropolyether

A polymer which has not only good compatibility with the above-mentioned commercially available low molecular weight perfluoropolyethers but also a high molecular weight and in turn a high viscosity, is considered to be useful as a viscosity modifier which improves the viscosity properties at high temperatures of the above-mentioned perfluoropolyethers and solves the above-mentioned problems inevitably accompanying the low molecular weight perfluoropolyethers. However, polymers which have such properties and can readily be synthesized, have not been obtainable by conventional means.

The high molecular weight PTR which can readily be synthesized from high molecular weight PIA by the method of the present invention, exhibits not only good compatibility with a perfluoropolyether but also a satisfactorily high viscosity at high temperatures and, therefore, the high molecular weight PTR is suitable as a viscosity modifier for a perfluoropolyether type oil or grease.

That is, a composition prepared by incorporating the high molecular weight PTR of the present invention into a low molecular weight perfluoropolyether, is capable of functioning as a good lubricant even at high temperatures since the composition exhibits a satisfactory viscosity even at high temperatures. Further, with respect to the use of the composition as a grease, the so-called oil-separation of the grease at high temperatures is advantageously suppressed and, hence, the life of the grease at high temperatures is greatly improved.

Accordingly, the high molecular weight PTR of the present invention is extremely useful as a viscosity modifier for improving the high temperature properties of various perfluoropolyethers.

With respect to the HFPO type PTR which is useful as a viscosity modifier, the intrinsic viscosity is generally in the range of from 0.05 dl/g to 0.65 dl/g, preferably in the range of from 0.10 dl/g to 0.65 dl/g, more preferably in the range of from 0.15 dl/g to 0.65 dl/g.

When the intrinsic viscosity is lower than 0.05 dl/g, the effect of the PTR as a viscosity modifier is poor. On the other hand, when the intrinsic viscosity is higher than 0.65 dl/g, not only is the synthesis of such a PTR difficult, but also the mixing operation between the solid PTR and a perfluoropolyether becomes difficult.

When the PTR of the present invention is used as a viscosity modifier for a perfluoropolyether, the amount of PTR in a composition comprising the PTR and the perfluoropolyether is generally in the range of from 1 to 50% by weight, preferably in the range of from 3 to 40% by weight, more preferably in the range of from 5 to 30% by weight, based on the total weight of the PTR and the perfluoropolyether.

When the amount of PTR in the above-mentioned composition is too small, the effect by the PTR incorporated is poor. On the other hand, when such a high viscosity PTR is used in too large an amount, the viscosity of the composition becomes too high, so that the composition is not desirable as a lubricant.

The composition comprising the PTR and the perfluoropolyether may further contain additives, such as a thickener and an extreme pressure additive, in a proportion of up to 40% by weight, based on the total weight of the PTR and the perfluoropolyether.

Moreover, it is noted that the PTR per se of the present invention exhibits high chemical resistance and solvent resistance comparable to those of a perfluoropolyether, and also, alike a perfluoropolyether, does not substantially adversely affect the dimensions and properties of various plastics and elastomers when blended therewith.

Therefore, not only the PTR per se of the present invention but also a perfluoropolyether containing the PTR of the present invention as a viscosity modifier, has additional advantage in that these can be used in combination with a wide variety of other materials.

(Application-3) Lubricant for a magnetic recording material

As a lubricant for a magnetic recording material, particularly a metallic thin film type magnetic recording material, there have conventionally been used a perfluoropolyether, such as Krytox® and Fomblin®. However, there has been a problem such that when a conventional perfluoropolyether is used, the formed lubricant layer is poor in durability.

That is, when a perfluoropolyether, such as Krytox® and Fomblin®, is used for a metallic thin film type magnetic disk to provide a lubricant layer thereon, the coefficient of friction of the formed lubricant layer, as measured by a contact-start-stop test (hereinafter referred to as "CSS test"), is disadvantageously increased, and the lubricating performance becomes low due to the dissolution-out of the lubricant during the washing with isopropyl alcohol in the production process. Further, when the lubricant is used for a metallic thin film type magnetic tape, the lubrication performance is lowered by the contact with a magnetic head.

In such situations, attempts have been made to improve the durability of the lubricant layer, for example, by introducing polar groups into the molecular terminals of a perfluoropolyether. However, no products which exhibit a satisfactory performance have been obtained.

The high molecular weight PTR which is readily prepared from the high molecular weight PIA synthesized by the method of the present invention, has satisfactory lubricating properties and, because of its high molecular weight, exhibits an excellent durability as measured by a CSS test when used for a magnetic disk. Further, the high molecular weight PTR is almost insoluble in a solvent which contains no fluorine atom, such as isopropyl alcohol, and hence, the lubricating properties are not lowered even when washed with isopropyl alcohol. Still further, when the PTR is used on a magnetic tape, high durability is exhibited even under the contact pressure of a head or the like. Thus, the PTR of the present invention is extremely promising as a lubricant for a magnetic recording material.

With respect to the perfluoropolyether type PTR which is useful as a lubricant for a magnetic recording material, the intrinsic viscosity is generally in the range of from 0.02 dl/g to 0.65 dl/g, preferably in the range of from 0.10 dl/g to 0.65 dl/g, more preferably in the range of from 0.15 dl/g to 0.65 dl/g.

When the intrinsic viscosity is lower than 0.02 dl/g, the lubricating layer is poor in durability and therefore such a PTR is not suitable as a lubricant for a magnetic recording material. On the other hand, when the intrinsic viscosity is higher than 0.65 dl/g, not only is such a PTR difficult to produce, but also the solubility in a solvent is low so that it is difficult to form a uniform, thin coating layer over the surface of a magnetic recording material.

The high molecular weight PIA comprising recurring units represented by formula (I), which is synthesized by the method of the present invention, can also be used as a lubricant for a magnetic recording material, as in the case of the high molecular weight PTR. When the PIA is used for this application, for the same reasons as in the case of the PTR, the intrinsic viscosity is generally in the range of from 0.02 dl/g to 0.60 dl/g, preferably in the range of from 0.10 dl/g to 0.60 dl/g, more preferably in the range of from 0.12 dl/g to 0.60 dl/g.

(Application-4) Highly stable, torque transmitting oil

In a torque transmitting apparatus utilizing the viscosity of a high viscosity oil, such as a viscous coupling, a high viscosity oil having from tens of thousands (preferably about 100,000) to 500,000 centistokes (cst) is employed as a torque transmitting oil.

Conventionally, as a torque transmitting oil, there has most frequently been employed a high viscosity silicone oil which can easily be synthesized. However, in the case of the silicone oil, gelation of the oil by decomposition is likely to occur at a temperature of 200° C. or more and, hence, the oil cannot be used for a long period of time at a temperature of 200° C. or more. Further, since a silicone oil is poor in load-carrying ability as compared to a perfluoropolyether and a mineral oil, there is a serious problem in that the anti-wear ability is low at the time when the torque is transmitted by solid friction between plates which are brought into contact with each other (that is, at the time of the so-called "hump phenomenon").

Therefore, it has been desired to develop a highly stable, torque transmitting oil which can be used under severe conditions more stably than a silicone oil type torque transmitting oil, that is, to develop a torque transmitting oil having heat resistance and load-carrying ability which are higher than those of a silicone oil.

Various perfluoropolyether type oils which are currently commercially available, have a heat stability such that it can withstand a temperature of 300° C. or more. However, these oils are low in molecular weight (number average molecular weight ≦10,000) and the viscosities at 40° C. thereof are about 500 centistokes at the highest and, hence, these oils cannot be employed as a torque transmitting oil to be used in a viscous coupling or the like.

By contrast, according to the method of the present invention, a high molecular weight perfluoropolyether type PTR is readily synthesized, which PTR is stable at 250° C. or more, or at 300° C. or more, as demonstrated in Examples 24, 25, 36 and 37. Further, as demonstrated in Example 23, the PTR of the present invention exhibits a good load-carrying ability which is comparable to that of a commercially available perfluoropolyether which has been employed as a lubricating oil. In addition, as shown in Example 26, it has been confirmed that the PTR of the present invention exhibits a high resistance to oxidative corrosion, which is comparable or superior to that of a commercially available perfluoropolyether, even in the copresence of various metallic materials and, therefore, can stably be used in a metal-made apparatus at a high temperature of 300° C. or more.

Further as demonstrated in Example 37, even when the high viscosity PTR prepared by the method of the present invention is heat-treated at 250° C. in air for 30 days, no change is observed. In addition, as demonstrated in Example 38, when the PTR of the present invention is charged into a torque transmitting apparatus and the stress exerted is measured before and after the above-mentioned heat treatment, no change in stress is observed, and thus it has been confirmed that the PTR of the present invention maintains a stable, torque transmitting ability for a long period of time even under high temperature conditions.

As described above, the high viscosity PTR obtained by the method of the present invention is useful as a highly stable, torque transmitting oil which can be used at a temperature of 200° C. or more, especially a temperature as high as around 300° C.

With respect to the PTR which is useful as a torque transmitting oil, the intrinsic viscosity varies depending on the objective of use and use conditions. However, at about 40° C., the intrinsic viscosity is generally in the range of from 0.05 dl/g to 0.25 dl/g, preferably in the range of from 0.10 dl/g to 0.25 dl/g, more preferably in the range of from 0.15 dl/g to 0.25 dl/g.

(Application-5) Surface treating agent for an inorganic material

The PIA obtained by the method of the present invention has adsorbability onto the surface of various inorganic materials, e.g., 1) metallic materials, such as aluminum, stainless steel, copper, iron, nickel and cobalt and 2) ceramics, such as glass, earthenware, various metal oxides (such as ferrite, magnetite, alumina and zirconia), and metal sulfides (such as molybdenum dioxide). Since a perfluoropolyether inherently exhibits no interaction with the surface of inorganic materials mentioned above, it is presumed that the adsorbability of the PIA is attributable to the interaction between the imidoylamidine group of the PIA and the surface of an inorganic material.

For example, when a metallic material (such as stainless steel) or a ceramic material (such as glass) is immersed in a solution prepared by dissolving the present PIA in a fluorine-containing solvent, and then taken out of the solution, followed by drying, a PIA coating layer is formed on the surface of the above- mentioned metallic or ceramic material. Even when the above-obtained material coated with a PIA coating layer is washed with a fluorine-containing solvent which is a good solvent for the PIA, the PIA remains on the surface of the material. This shows that the PIA is strongly adsorbed onto the surface of the metallic or ceramic material.

In this connection, it should be noted that when the surface of a stainless steel plate or a glass plate is treated with a solution prepared by dissolving a perfluoropolyether oil, such as Krytox® and Fomblin®, in a fluorine-containing solvent, the perfluoropolyether is not uniformly dispersed over the surface of the material, and high water repellent properties and high oil repellent properties cannot be obtained. Further, when the coated surface is washed with a fluorine-containing solvent, substantially all of the perfluoropolyether is removed.

On the other hand, the surface of metallic and ceramic materials treated with the PIA obtained as described above exhibits high water and oil repellent properties as compared to the non-treated surface of such materials.

Accordingly, various types of PIA's which can be obtained by the method of the present invention are useful as a water repellent, a moisture permeation preventive or a stain-proofing agent for the surface of metallic and ceramic materials. Moreover, utilizing the adsorbability to the surface of a metal material and the capability of forming a hydrophobic surface which are possessed by the PIA, the PIA of the present invention can be used singly or in combination with another fluoro-oil as a surface treating agent for improving the corrosion resistance, e.g., acid resistance or rustproof properties, of a metal surface.

Further, by the surface treatment of a particulate inorganic material with the PIA, it is possible to suppress the association of the inorganic particles and improve the affinity thereof for a fluoro-material. Accordingly, the treatment with the PIA is useful for suppressing the coagulation of fine particles of an inorganic material and for improving the dispersibility of an inorganic additive in a fluoro-material.

Examples of practical applications of the PIA to the surface treatment of fine particles of an inorganic material are found in the production of a liquid having fine particles of an inorganic material dispersed therein, such as a magnetic fluid (which comprises fine particles of a magnetic material dispersed in a liquid and is required to exhibit stable dispersion), in the improvement of the dispersion of an inorganic additive in a fluoroelastomer or a fluororesin, and in the suppression of an oil separation (separation of a base oil from a thickener) by modifying the surface of an inorganic thickener for a grease comprising a viscous fluoro-oil as a base oil. The above-mentioned PIA treatment of the surface of various inorganic materials may be conducted at about room temperature, or at a temperature of from 0° to 300° C., preferably from 0° to 200° C., more preferably from 0° to 150° C.

The intrinsic viscosity of the PIA to be used as a modifier for the surface of an inorganic material is not particularly limited. However, from the viewpoint of ease of synthesis and handling and effect, the intrinsic viscosity is generally in the range of from 0.02 to 0.60 dl/g, preferably from 0.10 to 0.60 dl/g, and more preferably from 0.12 to 0.60 dl/g.

(Application-6) Perfluoroelastomer

It has conventionally been attempted to crosslink a ternary copolymer of tetrafluoroethylene, perfluoromethylperfluorovinylether and a nitrile group-substituted perfluorovinylether by the use of a crosslinking agent capable of forming a triazine ring by causing the nitrile groups to be bonded there-through, thereby obtaining an elastomer having resistance to heat and chemicals. However, this type of elastomer exhibits a glass transition temperature of about −10° C., which is still not satisfactorily low and, therefore, cannot be satisfactorily used at low temperatures.

On the other hand, a crosslinked polymer which can be obtained by crosslinking the nitrile groups as crosslinking sites of a polymer comprising a perfluoropolyether chain as a main chain and having nitrile groups as pendant groups, would exhibit a low glass transition temperature due to the high mobility of the main chain structure thereof and, accordingly, is expected to be an elastomer having excellent properties at low temperatures.

This type of elastomer is disclosed in, for example, Japanese Patent Application Laid-Open Specification No. 57-176973. The disclosed elastomer is obtained by crosslinking a copolymer of hexafluoropropylene oxide and a nitrile group-substituted perfluoroalkylene oxide. However, this copolymer, before being crosslinked, has a molecular weight of only about $3 \times 10^4$ to $4.3 \times 10^4$ and therefore cannot contain a large number of crosslinking sites (nitrile groups) arranged at sufficiently long intervals, so that an elastomer obtained therefrom by crosslinking cannot have a suitable crosslinked structure for giving excellent mechanical properties.

By contrast, the polytriazine of formula (III), wherein R has a nitrile group as a substituent group, has a large molecular weight and, therefore, can contain a large number of nitrile groups at sufficiently long intervals, so that it can provide a freely selected polymer structure with respect to a crosslinked polymer thereof, thereby enabling an elastomer having excellent mechanical properties, such as excellent elongation, to be easily obtained.

Especially when the polytriazine of formula (III), wherein R has a nitrile group as a substituent group, has an intrinsic viscosity of from 0.15 dl/g to 0.65 dl/g and a number average molecular weight of from about $1.5 \times 10^4$ to about $2 \times 10^5$, preferably from about $2 \times 10^4$ to about $1.2 \times 10^5$, more preferably from about $3 \times 10^4$ to about $8 \times 10^4$, per nitrile group, the polytriazine can provide an elastomer having excellent mechanical properties.

When the distance between the nitrile groups is too short, a crosslinked polytriazine becomes brittle. On the other hand, the distance between the nitrile groups is too long, the tensile strength of a crosslinked polytriazine is likely to be small.

A polytriazine of formula (III) wherein R has a nitrile group as a substituent group, which is particularly suitable for producing a perfluoroelastomer, can be represented by the following formula (III'):

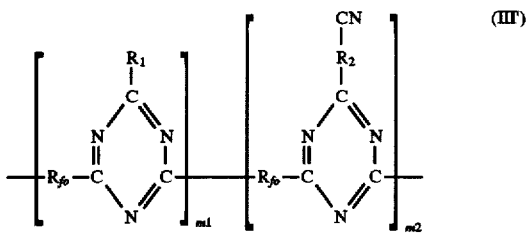

(III')

wherein $m_1$ is 0 or a positive integer, $m_2$ is a positive integer of at least 2, preferably at least 4, more preferably at least 8, $R_1$ has the same meaning as R defined for formula (III) and NC—$R_2$ has the same meaning as R defined for formula (III) wherein R has a nitrile group as a substituent group.

The nitrile group-containing polytriazine of formula (III') can be easily obtained by reacting the polyimidoylamidine of formula (I) with an NC—$R_2$ group-containing acylating agent alone or a mixture of an NC—$R_2$ group-containing acylating agent and an $R_1$ group-containing acylating agent. The $m_1/m_2$ ratio can be controlled by choosing the composition of the acylating agent, and can be easily confirmed by $^{19}$F-NMR spectrometry or infrared absorption spectrometry.

The number average molecular weight, per nitrile group, of the nitrile group-containing polytriazine of formula (III') can be determined by calculation based on the number average molecular weight of $R_{fo}$ and the m1/m2 ratio.

A crosslinking agent to be used for crosslinking the polytriazine of formula (III') is not specifically limited as long as it is capable of crosslinking the nitrile groups as crosslinking sites. But, in general, it is preferred to use a crosslinking agent having a triazine-ring forming activity, such as ammonia or an organotin compound.

When ammonia is used as a crosslinking agent, the crosslinking reaction is conducted at a temperature of from 100° C. to 350° C. When an organotin compound is used, the temperature of the crosslinking reaction varies, to some extent, depending on the structure of the organotin compound, but is generally in the range from 20° C. to 300° C.

The tin of the organotin compound to be used as a crosslinking agent is generally tetravalent. Examples of organotin compounds include those which have the following formula:

wherein $K_1$, $K_2$, $K_3$ and $K_4$ are each a hydrocarbon residue selected from an aryl group having 6 to 10 carbon atoms, an alkyl group having 1 to 6 carbon atoms, an allyl group, a propargyl group and an allenyl group.

Illustrative examples of these compounds include tetraphenyltin, tetraallyltin, tetrapropargyltin, allyltriphenyltin and allenylpropargyldiphenyltin.

In the crosslinked polytriazine of the present invention, various conventional additives, such as filter, stabilizer, plasticizer, lubricating agent and processing aid can be incorporated in an amount as conventionally employed in the art. Among the additive, carbon black or graphite fluorides, including $(CF)_n$ and $(C_2F)_n$ can be advantageously used.

The crosslinked polytriazine of the present invention exhibits not only high resistance to heat and chemicals, but also a glass transition temperature as low as $-30°$ C. or less, preferably $-40°$ C. or less, so that the crosslinked polytriazine can be advantageously used as an idealistic elastomer suitable as a material for a sealant and a packing material which can be used over a wide range of temperature, from lower temperatures to higher temperatures.

(Application-7) Other Applications

The PTR having an intrinsic viscosity of from 0.05 to 0.65 dl/g, preferably from 0.10 to 0.65 dl/g, and more preferably from 0.15 to 0.65 dl/g is substantially insoluble in various solvents other than fluoro-solvents as demonstrated in Examples 17 to 21 and 47 to 49, and is stable against various chemicals as demonstrated in Example 39. Therefore, the PTR can be used as a lubricant in an environment of vapors of organic solvents other than fluoro-solvents or of various chemicals, or at a site where the PTR is brought into direct contact with organic solvents other than fluoro-solvents or with various chemicals.

The above-mentioned PTR is also suitable as a lubricant for the surface of a wide variety of polymer materials, e.g., various types of plastics and elastomers, because the PTR substantially does not change swell the polymer materials, so that the properties of the polymer materials are not changed as demonstrated in Examples 17 to 21 and 47 to 49.

Moreover, the PTR having an intrinsic viscosity of from 0.15 to 0.65 dl/g, especially from 0.25 to 0.65 dl/g, is useful as a sealant material, because it substantially does not exhibit any fluidity at about room temperature. Further, because it has high solvent resistance and chemical resistance as described above, the PTR is useful as a high stability sealant material having corrosion resistance and solvent resistance.

When a PTR (one whose terminals have not been stabilized) having an intrinsic viscosity of from 0.02 to 0.65 dl/g, preferably from 0.15 to 0.65 dl/g, is heated at a temperature of from 150° to 400° C., preferably from 200° to 350° C., in the presence of a catalyst for a triazine ring forming reaction, such as ammonia, and an organotin compound including allyltriphenyltin or tetraphenyltin, a crosslinked polymer which has elasticity and is insoluble in fluoro-solvents is obtained. The resultant crosslinked polymer is useful as a sealant material having not only corrosion resistance and heat resistance but also solvent resistance.

Further, the PTR of the present invention has a low dielectric constant (1.8 to 2.2 at $10^5$Hz) and a high specific volume resistance (about $10^{14}$ ohm.cm) and has a low refractive index $n_D$ (1.9 to 2.3). Therefore, the PTR is useful as a material for not only electronic parts but also optical parts.

PREFERRED EMBODIMENT OF THE INVENTION

Hereinbelow, the present invention will be illustrated with reference to Examples, which however should not be construed as limiting the present invention.

[Synthesis of $R_{fo}(CN)_2$]

Hereinbelow, examples of methods for synthesizing various types of $R_{fo}(CN)_2$ to be used for the syntheses of the PIA and PTR according to the present invention will be described, which however should not be construed as limiting the method of synthesizing $R_{fo}(CN)_2$ to be employed in the present invention.

SYNTHETIC EXAMPLE 1

According to the HFPO polymerization method described in Japanese Patent Application Publication Specification No. 53-5360, the HFPO purification method described in Japanese Patent Application Laid-Open Specification No. 57-175185 and the polymer terminal group conversion method described in U.S. Pat. No. 3,317,484, wherein slight modification was effected, 223 g of a crude $R_{fo}(CN)_2$ having a number average molecular weight of about 2,000 was synthesized using a polymerization initiator of the formula:

The crude $R_{fo}(CN)_2$ was purified by column chromatography using 150 g of 200 mesh activated alumina and using pefluorohexane as a developing solvent. As a result, 222 g of a colorless, transparent viscous liquid was obtained.

The resultant crude $R_{fo}(CN)_2$ was subjected to analysis by means of $^{19}$F-NMR spectroscopy. As a result, it was found that the number average molecular weight (MWn) was about 2,010 and the bifunctionality was 97.7 mol %.

56.2 g of crude $R_{fo}(CN)_2$ was purified by distillation using a Kugelrohr-type thin film distillation apparatus at a pressure of about 0.1 mmHg.

9.8 g of initial stage distillation fraction having been distilled off at a heating temperature of 150° C. was removed, and 10.2 g of second stage distillation fraction having been distilled off at a heating temperature of 160°–170° C., 22.8 g of third stage distillation fraction having been distilled off at a heating temperature of 170°–180° C. and 10.6 g of fourth stage distillation fraction having been distilled off at a heating temperature of 180°–190° C. were collected. Each of the second stage, third stage and fourth stage distillation fractions was subjected to analysis by means of $^{19}$F-NMR spectroscopy. The results as shown in the following Table were obtained.

| Distillation fraction | Yield | Bifunctionality | $\overline{MWn}$ |
|---|---|---|---|
| second stage | 10.2 g | 99.6 mol % | 2,010 |
| third stage | 22.8 g | 99.9 mol % or higher | 2,120 |
| fourth stage | 10.6 g | 99.9 mol % or higher | 2,230 |

SYNTHETIC EXAMPLE 2

In substantially the same manner as described in Synthetic Example 1, a column treated crude $R_{fo}(CN)_2$ was obtained, which had a number average molecular weight of 3,350 and a bifunctionality of 97.5 mol %.

52.3 g of crude $R_{fo}(CN)_2$ was purified by distillation using a Kugelrohr-type thin film distillation apparatus. 4.9 g of initial stage distillation fraction having been distilled off at a heating temperature of 200° C. and at a pressure of 0.1 mmHg was removed, and 45.7 g of distillation fraction having been distilled off at a heating temperature of 200°–250° C. (pressure 0.1 mmHg) was collected. As a result of $^{19}$F-NMR spectroscopy analysis, the number average molecular weight of the principal distillation fraction was found to be 3,510 and the bifunctionality thereof was found to be 99.3 mol %.

SYNTHETIC EXAMPLE 3

In substantially the same manner as described in Synthetic Example 1, except that the column treatment was not conducted, a crude $R_{fo}(CN)_2$ was synthesized, which had a number average molecular weight of 4,760 and a bifunctionality of 97.3 mol %.

130 g of crude $R_{fo}(CN)_2$ was purified by distillation using a Kugelrohr-type thin film distillation apparatus. At a pressure of 0.03 mmHg, 28 g of initial stage distillation fraction having been distilled off at a heating temperature of 210° C. was removed, and 24 g of second stage distillation fraction having been distilled off at a heating temperature of 210°–230° C. and 55 g of third stage distillation fraction having been distilled off at a heating temperature of 230°–250° C. were collected.

As a result of $^{19}$F-NMR spectroscopy analysis, it was found that the number average molecular weight of the second stage distillation fraction was 4,800 and the bifunctionality thereof was 99.5 mol %, and that the number average molecular weight of the third stage distillation fraction was 5,090 and the bifunctionality thereof was not lower than 99.9 mol %.

SYNTHETIC EXAMPLE 4

In substantially the same manner as described in Synthetic Example 3, a crude $R_{fo}(CN)_2$ was synthesized, which had a number average molecular weight of 6,690 and a bifunctionality of 96.8 mol %.

78 g of crude $R_{fo}(CN)_2$ was purified by distillation using a Kugelrohr-type thin film distillation apparatus. By removing an initial stage distillation fraction having been distilled off at 250° C. under a reduced pressure of about 0.01 mmHg, 56 g of a yellow viscous liquid was obtained. The whole amount of the residue was purified by passing through a silica gel column, using perfluorohexane as a developing solvent. As a result, 55 g of a colorless, transparent viscous liquid was obtained.

The thus purified $R_{fo}(CN)_2$ was subjected to $^{19}$F-NMR spectroscopy analysis. As a result, it was found that the number average molecular weight was 7,150 and the bifunctionality was 99.6 mol %.

SYNTHETIC EXAMPLE 5

Substantially the same procedure as described in Synthetic Example 4 was repeated, except that a compound of the formula:

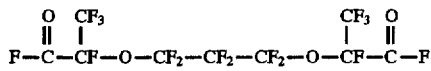

which contained about 11%, in terms of area ratio, of impurities as measured by gas chromatography, was used as a raw material of a bifunctional polymerization catalyst in place of the compound of the formula:

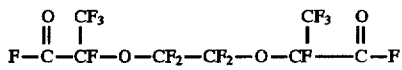

and that an HFPO having been passed through a molecular sieve column was used. As a result, a bifunctional oligomer $R_{fo}(CN)_2$ having the terminal groups converted to nitrile groups was synthesized. The number average molecular weight of the resultant crude $R_{fo}(CN)_2$ was about 6,000 and the bifunctionality thereof was 83.2 mol %.

The $R_{fo}(CN)_2$ was purified by passing through a silica gel column, using perfluorohexane as a developing solvent.

The resultant crude $R_{fo}(CN)_2$ was purified by distillation using a Kugelrohr-type thin film distillation apparatus. When 17 g was distilled off at a heating temperature of 250° C. under a reduced pressure of about 0.01 mmHg, distillation was discontinued and the residue was subjected to $^{19}$F-NMR spectroscopy analysis. As a result, it was found that the number average molecular weight was 6,800 and the bifunctionality was 95.4 mol %.

SYNTHETIC EXAMPLE 6

The crude $R_{fo}(CN)_2$ obtained as an intermediate material in the synthesis of $R_{fo}(CN)_2$ as described in Synthetic Example 1 was purified by passing through a silica gel column, using perfluorooctane as a developing solvent.

30 g of resultant crude $R_{fo}(CO_2Me)_2$ was purified by distillation using a Kugelrohr-type thin film distillation apparatus. First, 3.3 g of initial stage distillation fraction having been distilled off at a heating temperature of 160° C. under a reduced pressure of 0.15 mmHg was removed. Then, the heating temperature was gradually increased, and 24.2 g of second stage distillation fraction having been distilled off at up to 200° C. was obtained.

The second stage distillation fraction was subjected to $^{19}$F-NMR spectroscopy analysis. As a result, it was found that the number average molecular weight was 2,100 and the bifunctionality was 99.4 mol %.

SYNTHETIC EXAMPLE 7

In a flask having an inner volume of 1 liter, using a foot ball type rotor, 100 g of cesium fluoride, 170 g of tetraglyme and 100 g of $$\underset{\underset{O}{\overset{\|}{C}}}{\text{MeO}_2\text{CCF}_2\text{CF}_2\text{OCFCF}}\overset{CF_3}{|}$$

were agitated for three days. Then unreacted cesium fluoride was removed by centrifugation, thereby obtaining 309 g of a solution containing $$\text{MeO}_2\text{CCF}_2\text{CF}_2\text{OCF CF}_2\text{OCs}.\overset{CF_3}{\underset{|}{}}$$

Using a portion of this solution as a polymerization initiator solution, 20.8 g of a colorless, transparent $R_{fo}(CN)_2$ represented by the formula:

$$NCCF_2CF_2O\underset{}{}\left[\overset{CF_3}{\underset{|}{CFCF_2O}}\right]_{q'}\overset{CF_3}{\underset{|}{CFCN}}$$

(wherein q' is a positive integer),
which had a number average molecular weight of 4,980 and a bifunctionality of 97.8 mol %, was obtained, through a dimethyl ester, in substantially the same manner as described in Synthetic Example 1.

SYNTHETIC EXAMPLE 8

In substantially the same manner as described in Japanese Patent Application Laid-Open Specification No. 60-34924, 140 g of a crude $R_{fo}(CN)_2$ having the formula:

$$NCCF_2O(\text{-}CF_2CF_2O)_{\overline{m1}}(\text{-}CF_2O)_{\overline{m2}}\text{-}CF_2CN$$

wherein m1/m2=1.5
was synthesized. The obtained $R_{fo}(CN)_2$ had a number average molecular weight of 2,700. Not only the $R_{fo}(CO_2CH_3)_2$ used as an intermediate in the above synthesis but also the obtained crude $R_{fo}(CN)_2$ was purified by column chromatography using silica gel as a packing matrial and then by vacuum distillation.

This $R_{fo}(CN)_2$ is hereinafter referred to as "$R_{fo}(CN)_2[A]$".

SYNTHETIC EXAMPLE 9

In substantially the same manner as in synthetic Example 8, 160 g of a crude $R_{fo}(CN)_2$ having the formula:

$$NCCF_2O(\text{-}CF_2CF_2O)_{\overline{m3}}(\text{-}CF_2O)_{\overline{m4}}\text{-}CF_2CN$$

wherein m1/m2=0.6
was synthesized and purified. The obtained $R_{fo}(CN)_2$ had a number average molecular weight of 5,700. This $R_{fo}(CN)_2$ is hereinafter referred to as "$R_{fo}(CN)_2[B]$".

SYNTHETIC EXAMPLE 10

160 g of $R_{fo}(COF)_2$ having the formula:

$$\underset{\underset{O}{\overset{\|}{}}}{FCCF_2CF_2O}(\text{-}CF_2CF_2CF_2O)_n\underset{\underset{O}{\overset{\|}{}}}{\text{-}CF_2CF_2CF}$$

and having a number average molecular weight of 2,200 was reacted with methanol to obtain $R_{fo}(CO_2CH_3)_2$. This $R_{fo}(CO_2CH_3)_2$ was contacted with ammonia under atmospheric pressure to obtain $R_{fo}(CONH_2)_2$. This $R_{fo}(CONH_2)_2$ was reacted with phosphorus pentoxide in substandially the same manner as described in Japanese Patent Application Laid-Open Specification No. 60-34924 to obtain 86 g of a crude $R_{fo}(CN)_2$ (number average molecular weight: 2,550) which exhibits a characteristic absorption at 2,270 $cm^{-1}$ in the infrared absorption spectrum.

Not only the $R_{fo}(CO_2CH_3)_2$ obtained as an intermediate in the synthesis but also the obtained crude $R_{fo}(CN)_2$ was purified by column chromatography using activated alumina as a packing material and then by vacuum distillation.

This $R_{fo}(CN)_2$ is hereinafter referred to as "$R_{fo}(CN)_2[C]$".

EXAMPLE 1

Using $R_{fo}(CN)_2$ of the structure represented by the formula:

$$NC\text{-}CF(\text{-}OCF_2CF)\text{-}OCF_2CF_2O(\text{-}CFCF_2O)\text{-}CF\text{-}CN \overset{CF_3\ \ \ \ CF_3\ \ \ \ \ \ \ \ \ \ \ \ \ \ CF_3\ \ \ \ CF_3}{\underset{|\ \ \ \ \ \ \ \ \ |\ \ \ \ \ \ \ \ \ \ \ \ \ \ \ \ \ |\ \ \ \ \ \ \ \ \ |}{}} \quad (XXV)$$

having a number average molecular weight of 4,850 and a bifunctionality of 99.5 mol %, which had been obtained according to exactly the same procedure as employed in obtaining the second stage distillation fraction of Synthetic Example 3, the following reaction was performed.

20 g of ammonia and 30 ml of F-113 were charged in a pressure reactor vessel having an inner volume of 200 ml, and cooled to −15° C.

While agitating the contents of the reactor vessel, a solution prepared by dissolving 30.0 g of the above-mentioned $R_{fo}(CN)_2$ in 60 g of F-113 was added thereto at a flow rate of 20 ml/hr by means of a quantitative pump. Thereafter, agitation was conducted for 1 hour at −15° C. and for 12 hours at room temperature.

In the reaction solution, a small amount of suspended matter was observed. Therefore, the reaction solution was filtered by means of a filter paper and then the solvent was removed by means of an evaporator while heating at 60° C. As a result, a transparent viscous substance having a light pink color was obtained in an amount (30.1 g) which is substantially the same as that of the charged $R_{fo}(CN)_2$.

The viscous substance was subjected to infrared absorption spectroscopy. In the spectrum, a characteristic absorption band at 2,260 $cm^{-1}$ attributed to a nitrile group disappeared and a strong characteristic absorption band attributed to an amidine group Was observed at 1,695 $cm^{-1}$.

In the $^{19}F$-NMR spectrum as well of the viscous substance, the disappearance of a nitrile group and the formation of an amidine group were confirmed. Further, small amounts of groups other than an amidine group were also observed.

Subsequently, 4.0 g of the viscous substance (hereinafter referred to simply as $DA_1$), which was believed to comprise a diamidine as a principal component, and $R_{fo}(CN)_2$ were added in charge ratios as indicated in Table 1, and dissolved in 50 ml of F-113. The F-113 was completely removed by means of an evaporator, and the resultant transparent homogenous mixture of $DA_1$ and $R_{fo}(CN)_2$ was allowed to stand still at 40° C. for 15 hours. As a result, as shown in Table 1, various polymers were formed, which had respective intrinsic viscosities dependent on the charge ratio of $DA_1$ to $R_{fo}(CN)_2$.

TABLE 1

| No. of moles of $R_{fo}(CN)_2$ to be reacted with 4 g of $DA_1$/No. of moles of $R_{fo}(CN)_2$ used in the synthesis of 4 g of $DA_1$ (*1) | Intrinsic viscosity of PIA (dl/g) (*2) |
|---|---|
| 0.68 | 0.115 |
| 0.78 | 0.151 |
| 0.82 | 0.178 |
| 0.86 | 0.215 |
| 0.90 | 0.175 |
| 0.94 | 0.144 |
| 0.98 | 0.122 |

(*1) 0.82 mmol
(*2) in F-113, 30° C.

The formed polymers were subjected to infrared absorption spectroscopy. In all of the polymers, strong characteristic absorption bands attributed to an imidoylamidine band were observed at 1,600 cm$^{-1}$ and 1,660 cm$^{-1}$, whereby formation of a PIA was confirmed.

PIA's having an intrinsic viscosity of about 0.2 dl/g were a semisolid exhibiting substantially no fluidity but a slight elasticity at about room temperature. PIA's having an intrinsic viscosity of about from 0.12 to 0.15 dl/g were a waxy substance exhibiting a slight fluidity at about room temperature.

The intrinsic viscosity of 0.215 dl/g of the PIA corresponds to a viscosity average molecular weight of about 42×10$^4$, and the intrinsic viscosity of 0.122 dl/g of the PIA corresponds to a viscosity average molecular weight of about 15×10$^4$.

EXAMPLE 2

Using the $R_{fo}(CN)_2$ and $DA_1$ obtained according to exactly the same procedure as described in Example 1, the synthetic reaction of PIA was conducted on a scale 5 times that of Example 1. When the PIA synthetic reaction was performed at a molar ratio (of $R_{fo}(CN)_2$ to be reacted with $DA_1$ to the $R_{fo}(CN)_2$ used in the synthesis of $DA_1$) of 0.86, the intrinsic viscosity of the resultant PIA was 0.213 dl/g, which meant that substantially the same results as in Example 1 were obtained.

EXAMPLE 3

Using the same $R_{fo}(CN)_2$ as in Example 1, the following reaction was performed.

50 g of $R_{fo}(CN)_2$, 20.0 g of perfluorohexane and a rotor was put in a round bottom flask having an inner volume of 100 ml, and cooled to −40° C. Subsequently, about 10 g of ammonia was condensed in the flask, and reaction was performed at −40° C. for about 1 hour. Thereafter, the temperature of the reaction mixture was elevated to about room temperature over a period of about 1 hour, and agitation was further continued for 1 hour.

From the contents of the flask, low boiling point components were evaporated by means of an evaporator, thereby obtaining a viscous substance (hereinafter referred to simply as $DA_2$) comprising a diamidine as a principal component.

The whole quantity of the resultant $DA_2$ and 44.5 g of $R_{fo}(CN)_2$ were dissolved in 200 ml of F-113, and then the F-113 was completely removed by means of an evaporator, thereby obtaining a transparent homogeneous mixture of $DA_2$ and $R_{fo}(CN)_2$. The mixture was allowed to stand still at 40° C. for 20 hours. As a result, a transparent elastic solid exhibiting no fluidity at about room temperature was obtained.

The intrinsic viscosity of the elastic solid PIA as measured in perfluorooctane at 40° C. by means of an Ostwald viscometer was 0.288 dl/g, which corresponded to a viscosity average molecular weight of about 7×10$^5$.

EXAMPLE 4

The $R_{fo}(CN)_2$ having a number average molecular weight of 5,090 and a bifunctionality not lower than 99.9 mol %, which was obtained as a third stage distillation fraction in Synthetic Example 3, was further purified by column chromatography with silica gel, using perfluorohexane as a developing solvent.

From 10.0 g of the resultant highly purified $R_{fo}(CN)_2$, a viscous substance (hereinafter referred to simply as $DA_3$) comprising a diamidine as a principal component, was obtained by performing the treatment with ammonia according to substantially the same procedure as described in Example 3.

5.0 g of $DA_3$ and 4.40 g of the above-mentioned highly purified $R_{fo}(CN)_2$ were dissolved in 20 ml of perfluorohexane, and the perfluorohexane was completely removed by means of an evaporator, thereby obtaining a transparent homogeneous mixture of $DA_3$ and $R_{fo}(CN)_2$. The mixture was allowed to stand still at 40° C. for 30 hours, thereby obtaining a colorless, transparent elastic solid exhibiting no fluidity at about room temperature.

The intrinsic viscosity at 50° C. of the elastic solid PIA in 2H-tetradecafluoro-5-(trifluoromethyl)- 3,6-dioxanonane was 0.511 dl/g, corresponding to about 2×10$^6$ in viscosity average molecular weight.

EXAMPLE 5

Substantially the same procedure as described in Example 3 was repeated, except that the reaction between $DA_2$ and $R_{fo}(CN)_2$ was performed, in the presence of 10 ml of perfluorooctane, at 40° C. for three days. As a result, a PIA having an intrinsic viscosity of 0.241 dl/g was obtained.

EXAMPLE 6–12

Using various grades of $R_{fo}(CN)_2$ represented by the formula (XXV) which were synthesized in Examples 1 2, 3 and 4, and synthesized according to similar procedures, PIA's were synthesized according to substantially the same procedure as described in Example 3. The results are shown in Table 2.

EXAMPLE 13–16

According to substantially the same procedure as described in Synthetic Example 1, various types of $R_{fo}(CN)_2$ represented by the formula:

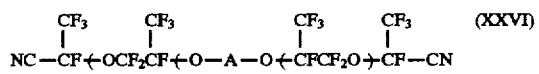

wherein A represents a bifunctional polymerization initiator residue were synthesized, using various types of bifunctional polymerization initiators.

Using the thus synthesized various types of $R_{fo}(CN)_2$, PIA's were synthesized according to substantially the same procedure as described in Example 3. The results are shown in Table 3.

TABLE 2

| Example No. | R_fo(CN)_2 Number average molecular weight | R_fo(CN)_2 Bifunctionality (mol %) | No. of moles of R_fo(CN)_2 used in the reaction with DA/No. of moles of R_fo(CN)_2 used in the synthesis of DA | Intrinsic viscosity of PIA (dl/g) |
|---|---|---|---|---|
| Example 6 | 1,460 | >99.9 | 0.74 | 0.186 |
| Example 7 | 2,120 | >99.9 | 0.82 | 0.215 |
| Example 8 | 3,510 | 99.3 | 0.85 | 0.221 |
| Example 9 | 4,120 | 98.3 | 0.83 | 0.156 |
| Example 10 | 6,170 | >99.9 | 0.82 | 0.477 |
| Example 11 | 7,150 | 99.6 | 0.85 | 0.304 |
| Example 12 | 10,700 | 96.5 | 0.92 | 0.207 |

TABLE 3

| Example No. | -A- (*1) | R_fo(CN)_2 Number average molecular weight | R_fo(CN)_2 Bifunctionality (mol %) | No. of moles of R_fo(CN)_2 used in the reaction with DA/No. of moles of R_fo(CN)_2 used in the synthesis of DA | Intrinsic viscosity of PIA (dl/g) |
|---|---|---|---|---|---|
| Example 13 | (CF_2)_3 | 4,180 | 99.4 | 0.86 | 0.245 |
| Example 14 | (CF_2)_5 | 4,260 | >99.9 | 0.84 | 0.410 |
| Example 15 | (CF_2)_5 | 6,320 | >99.9 | 0.90 | 0.437 |
| Example 16 | (CF_2)_6 | 5,180 | 99.7 | 0.89 | 0.311 |

(*1)Functional polymerization initiator residue A in formula (XXVI)

EXAMPLE 17

From the PIA having an intrinsic viscosity of 0.511 dl/g which was obtained in Example 4, a PTR was synthesized according to the following procedure.

A solution prepared by dissolving 4.0 g of PIA in 50 ml of 2H-tetradecafluoro-5-(trifluoromethyl)-3,6-dioxanonane and 4.0 g of trifluoroacetic anhydride were charged into a polyethylene vessel provided with a lid and having an inner volume of 200 ml, and agitated at 40° C. for 15 hours.

Subsequently, 100 ml of diethyl ether was gradually added dropwise to the resultant reaction mixture, thereby causing a polymer to be precipitated. The whole amount of the polymer was dissolved in 50 ml of 2H-tetradecafluoro-5-(trifluoromethyl)-3,6-dioxanonane, and then 100 ml of diethyl ether was added, thereby causing a polymer to be reprecipitated. From the resultant precipitate, low boiling point components were completely removed by means of an evaporator. As a result, 3.95 g of a transparent, elastic solid polymer was obtained.

In the infrared absorption spectrum of the elastic solid, characteristic absorption bands at 1600 cm$^{-1}$ and 1660 cm$^{-1}$ which are attributed to a polyimidoylamidine, disappeared, and a sharp characteristic absorption band attributed to a triazine ring was observed at 1550 cm$^{-1}$. From the above, it was confirmed that by the above procedure, the conversion from the PIA to a PTR was carried out.

The intrinsic viscosity of the resultant PTR was 0.562 dl/g.

The PTR was substantially insoluble in organic solvents, such as toluene, octane, petroleum ether, ethyl ether, ethyl acetate, acetone, carbon tetrachloride, methanol and tetrahydrofuran, exhibiting high solvent resistance.

Incidentally, the PTR was blended with a plastic, such as polyacetal, 6-nylon, polyethylene, polycarbonate and polytetrafluoroethylene, and heated at 70° C. for one week. Despite such a heating, the plastics did not substantially undergo any dimensional change or weight change. From the above, the excellent compatibility of the PTR with various types of plastics was confirmed.

EXAMPLE 18

From the PIA having an intrinsic viscosity of 0.288 dl/g which was obtained in Example 3, a PTR was synthesized according to substantially the same reaction as described in Example 17, except that 10.0 g of

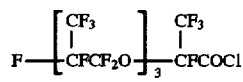

was used in place of 4.0 g of trifluoroacetic anhydride, and that with respect to the reaction conditions, a heating at 80° C. for 24 hours was carried out in place of the heating at 40° C. for 15 hours.

As a result, 4.36 g of a transparent, elastic solid PTR having an intrinsic viscosity of 0.308 dl/g was obtained.

This PTR exhibited the same high solvent resistance and compatibility with various types of plastics as those of the PTR obtained in Example 17.

EXAMPLE 19

From the PIA having an intrinsic viscosity of 0.144 dl/g obtained in Example 1, a PTR was synthesized according to substantially the same reaction as described in Example 17, except that 8.0 g of

was used in place of 4.0 g of trifluoroacetic anhydride, that perfluorohexane was used in place of 2H-tetradecafluoro-5-(trifluoromethyl)-3,6-dioxanonane, and that with respect to the reaction conditions a heating at 50° C. for 30 hours was carried out in place of the heating at 40° C. for 15 hours.

As a result, 4.24 g of a transparent waxy PTR having an intrinsic viscosity of 0.151 dl/g was obtained. This PTR as well exhibited the same high solvent resistance and compatibility with various types of plastics as those of the PTR obtained in Example 17.

EXAMPLE 20

From the PIA having an intrinsic viscosity of 0.115 dl/g obtained in Example 1, a PTR was synthesized according to substantially the same reaction as described in Example 19, except that F-113 was used in place of perfluorohexane, and that with respect to the reaction conditions, a heating at 45° C. for 48 hours was carried out in place of the heating at 50° C. for 30 hours.

As a result, 4.28 g of a transparent, high viscosity PTR having an intrinsic viscosity of 0.126 dl/g was obtained. This PTR as well exhibited the same high solvent resistance and compatibility with various types of plastics as those of the PTR obtained in Example 19.

EXAMPLE 21

A PIA having an intrinsic viscosity of 0.077 dl/g was obtained according to exactly the same procedure as described in Example 1, except that the ratio of the number of moles of $R_{fo}(CN)_2$ to be reacted with 4 g of $DA_1$ to the number of moles of $R_{fo}(CN)_2$ used for preparing 4 g of $DA_1$ was 0.63.

Exactly the same procedure as described in Example 20 was repeated except that the above PIA was used as a starting material, thereby obtaining 4.15 g of a transparent viscous PTR having an intrinsic viscosity of 0.082 dl/g. This PTR as well exhibited the same high solvent resistance and compatibility with various types of plastics as those of the PTR obtained in Example 20.

EXAMPLE 22

Using 30.0 g of the $R_{fo}(CN)_2$ having a number average molecular weight of 4,980 and a bifunctionality of 97.8 mol % obtained in Synthetic Example 7, the reaction thereof with ammonia was performed according to substantially the same procedure as described in Example 3. As a result, 30.2 g of a viscous substance (hereinafter referred to as simply $DA_3$) comprising a diamidine as a principal component was obtained.

Subsequently, according to substantially the same procedure as described in Example 3, 3.28 g of $R_{fo}(CN)_2$ obtained in Synthetic Example 7 was reacted with 4.0 g of $DA_3$ at 40° C. for 70 hours, thereby obtaining a semisolid PIA having an intrinsic viscosity of 0.157 dl/g in F-113 at 30° C.

The resultant PIA was reacted with

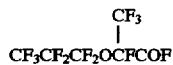

according to substantially the same procedure as described in Example 19, thereby obtaining a semisolid PTR having an intrinsic viscosity of 0.164 dl/g in F-113 at 30° C.

This PTR exhibited the same high solvent resistance and compatibility with various types of plastics as those of the PTR obtained in Example 17.

EXAMPLE 23

With respect to three types of PTR's obtained according to substantially the same procedures as described in Examples 19, 20 and 21 which respectively had intrinsic viscosities of 0.171 dl/g, 0.130 dl/g and 0.085 dl/g and the terminal-stabilized HFPO oligomer represented by the formula:

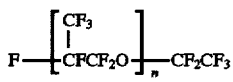

having a number average molecular weight of about 10,000, the lubricating properties were measured in accordance with JIS 2519. In the measurement, SODA four-ball friction tester was used, a test sample was coated on a test ball, and the test was conducted under 750 rpm×1 min conditions. The results are shown in Table 4.

TABLE 4

| Sample | (*1) Load carrying ability (MPa) | Wear scar diameter (mm) |
|---|---|---|
| PTR(intrinsic viscosity 0.171 dl/g) | 0.05 | 0.5 |
| PTR(intrinsic viscosity 0.130 dl/g) | 0.05 | 0.5 |
| PTR(intrinsic viscosity 0.085 dl/g) | 0.05 | 0.3 |
| $F-(CFCF_2O)_n-CF_2CF_3$ with CF_3 side group ($\overline{MW_n}$ about 10,000) | 0.05 | 0.5 |

(*1) Maximum oil pressure before failure

The above friction test results indicate that the high molecular weight PTR's exhibit lubricating properties which are similar to or higher than those of the terminal-stabilized HFPO oligomer having been used as a lubricant.

EXAMPLE 24

With respect to three types of PTR's obtained according to substantially the same procedures as described in Examples 19, 20 and 21, respectively having intrinsic viscosities of 0.171 dl/g, 0.130 dl/g and 0.085 dl/g, and a perfluoropolyether having a number average molecular weight of about 6,500 and represented by the following formula:

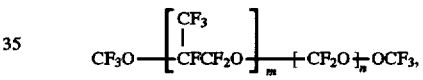

the weight decrease rate under heating conditions was measured by means of a thermobalance in an atmosphere of nitrogen. The results are shown in Table 5.

TABLE 5

| | Weight decrease rate | |
|---|---|---|
| Sample | 300° C. | 330° C. |
| PTR(intrinsic viscosity 0.171 dl/g) | 0.01 weight %/min or less | 0.01 weight %/min or less |
| PTR(intrinsic viscosity 0.130 dl/g) | 0.01 weight %/min or less | 0.01 weight %/min or less |
| PTR(intrinsic viscosity 0.085 dl/g) | 0.01 weight %/min or less | 0.01 weight %/min or less |
| $CF_3O-(CFCF_2O)_m-(CF_2O)_n-OCF_3$ | 0.06 weight %/min | 0.19 weight %/min |

EXAMPLE 25

With respect to three types of PTR's obtained according to substantially the same procedures as described in Examples 19, 20 and 21, respectively having intrinsic viscosities of 0.171 dl/g, 0.130 dl/g and 0.085 dl/g, and a terminal-stabilized HFPO oligomer having a number average molecular weight of about 8,250 and represented by the following formula:

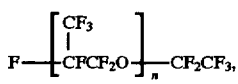

the weight decrease rate under heating and reduced pressure conditions was measured at 250° C. under 0.1 mmHg for 2 hours. The results are shown in Table 6.

TABLE 6

| Sample | Weight decrease rate* |
|---|---|
| PTR(intrinsic viscosity 0.171 dl/g) | 1 weight % or less |
| PTR(intrinsic viscosity 0.130 dl/g) | 1 weight % or less |
| PTR(intrinsic viscosity 0.085 dl/g) | 1 weight % or less |
| F—[CFCF$_2$O]$_n$—CF$_2$CF$_3$ (CF$_3$) | 29 weight % |

*250° C., 0.1 mmHg, 2 hours

EXAMPLE 26

With respect to three types of PTR's obtained according to substantially the same procedures as described in Examples 19, 20 and 21, respectively having intrinsic viscosities of 0.171 dl/g, 0.130 dl/g and 0.085 dl/g, and a terminal-stabilized HFPO oligomer having a number average molecular weight of about 8,250 and represented by the following formula:

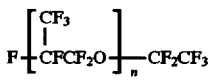

each thereof was contacted with various types of metals and then, heated in air at 330° C. for 10 hours. The degree of corrosion of each metal surface is shown in Table 7.

The results show that with respect to stainless steel (SUS 304) and titanium, the PTR's exhibit the same resistance to oxidative corrosion as that of the terminal-stabilized HFPO oligomer, and that with respect to aluminum, the PTR's exhibit greater resistance to oxidative corrosion than that of the terminal-stabilized HFPO oligomer. Also, the results show that even when the temperature is as high as 300° C. or more, the PTR's can be stably used in the presence of various types of metals.

TABLE 7

| Sample | Conditions of metal surface (*1) | | |
|---|---|---|---|
| | SUS304 | titanium | aluminum |
| PTR(intrinsic viscosity 0.171 dl/g) | O | O | O |
| PTR(intrinsic viscosity 0.130 dl/g) | O | O | O |
| PTR(intrinsic viscosity 0.085 dl/g) | O | O | O |

TABLE 7-continued

| Sample | Conditions of metal surface (*1) | | |
|---|---|---|---|
| | SUS304 | titanium | aluminum |
| F—(CFCF$_2$O)$_n$—CF$_2$CF$_3$ (CF$_3$) | O | O | X |

O: No metal corrosion was observed.
X: Metal corrosion was observed.
(*1): 330° C. in air, after 10 hours

EXAMPLE 27

With respect to two types of PTR's obtained according to substantially the same procedures as described in Examples 20 and 21, respectively having intrinsic viscosities of 0.130 dl/g and 0.085 dl/g, and a terminal-stabilized HFPO oligomer having a number average molecular weight of about 8,250 and represented by the following formula:

$$F-[CFCF_2O]_n-CF_2CF_3, \quad (CF_3)$$

the viscosities at 200° C. and 300° C. were determined by means of a Brookfield rotational viscometer. The results are shown in Table 8.

TABLE 8

| | Kinematic viscosity | |
|---|---|---|
| Sample | 200° C. | 300° C. |
| PTR(intrinsic viscosity 0.130 dl/g) | 2200 cst | 580 cst |
| PTR(intrinsic viscosity 0.085 dl/g) | 570 cst | 150 cst |
| F—(CFCF$_2$O)$_n$—CF$_2$CF$_3$ (CF$_3$) | 6 cst | 2 cst |

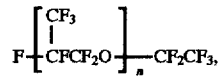

EXAMPLE 28

The terminal-stabilized HFPO oligomer having a number average molecular weight of 8,250 and the PTR's having various magnitudes of molecular weights, which were used in Example 25, became greasy when they were mixed with fine particulate polytetrafluoroethylene, and hence could be used as a grease lubricant.

The degrees of oil separation (that is, the degree of separation at high temperatures of the fine particulate polytetrafluoroethylene used as a thickener from various types of base oils) at 200° C. and 300° C. of these various types of greases were compared. The results are shown in Table 9.

Table 9 shows that the grease prepared by using the terminal-stabilized HFPO oligomer exhibits marked oil separation at high temperatures and hence this grease is unsuitable for use as a high temperature lubricant, and that however, the greases prepared by using the PTR's exhibit low oil separation even at high temperatures and hence these greases are capable of functioning as a high temperature lubricant even at temperatures as high as 200° C. or more, especially around 300° C.

TABLE 9

| Base oil of grease | Degree of oil separation of grease (*1) (%) | |
|---|---|---|
| | 300° C. | 330° C. |
| PTR(intrinsic viscosity 0.171 dl/g) | <1 | 2 |
| PTR(intrinsic viscosity 0.130 dl/g) | <1 | 3 |
| PTR(intrinsic viscosity 0.085 dl/g) | 1 | 6 |
| 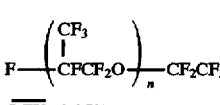 $\overline{\text{MWn}}$ 8,250 | 9 | 23 |

(*1): base oil/fine particulate polytetrafluoroethylene = 85/15 (weight ratio)

[Grease was prepared by using Lubron® LD-1 manufactured by Daikin Kogyo Co., Ltd. [comprising fine particulate polytetrafluoroethylene having a particle diameter of 0.2μ dispersed in 1,1,2-trichloro-1,2,2-trifluoroethylene].]

From Examples 23 to 28, it has become apparent that various types of PTR's having specific viscosities are effective as a high temperature lubricant for use at temperatures as high as 200° C. or more, especially around 300° C. and/or as a high vacuum lubricant.

EXAMPLE 29

The PTR having an intrinsic viscosity of 0.126 dl/g obtained in Example 20 was dissolved in 2H-tetradecafluoro-5-(trifluoromethyl)-3,6-dioxanonane to prepare a 0.1% by weight solution. A thin film medium for a magnetic recording disk, which was prepared by forming a Co—Ni—Pt type magnetic material film according to a sputtering process, was dipped in the above-prepared solution and taken out, followed by heating at 250° C. for 10 minutes, to thereby form a layer of lubricant on the surface of the thin film medium for a magnetic recording disk.

With respect to the surface of the resultant thin film medium for a magnetic recording disk, the coefficient of friction was measured by means of a disk abrasion-friction tester (model PT-101) manufactured by Pati Technology Inc., Japan. As a result, the coefficient of friction was found to be 0.2.

EXAMPLE 30

Using, individually, the PTR obtained in Example 18 having an intrinsic viscosity of 0.308 dl/g, the PIA's obtained in Example 1, respectively having intrinsic viscosities of 0.112 dl/g and 0.215 dl/g, and a perfluoropolyether having a number average molecular weight of about 6,500 and represented by the following formula:

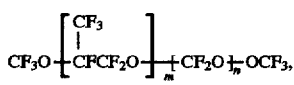

a layer of lubricant was formed on the surface of the thin film medium for a magnetic recording disk in substantially the same manner as described in Example 29.

The coefficients of friction on the surfaces of these thin film media for a magnetic recording disk were evaluated in substantially the same manner as in Example 29. The results are shown in Table 10.

Further, using the same apparatus, CSS test was conducted, and the coefficients of friction, after having repeated a sequence of start and stop 10,000 times, were measured. The results are shown in Table 10, together with the values of the media of Example 29.

TABLE 10

| | Coefficient of friction | |
|---|---|---|
| Sample | initial stage | after (*1) conducting CSS test |
| PTR(intrinsic viscosity 0.126 dl/g) | 0.2 | 0.6 |
| PTR(intrinsic viscosity 0.308 dl/g) | 0.2 | 0.6 |
| PIA(intrinsic viscosity 0.112 dl/g) | 0.2 | 0.6 |
| PIA(intrinsic viscosity 0.215 dl/g) | 0.2 | 0.6 |
| 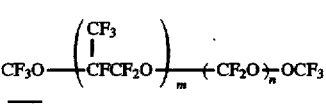 ($\overline{\text{MWn}}$ about 6,500) | 0.2 | 0.6 |

(*1): after having repeated a sequence of start and stop 10,000 times

EXAMPLE 31

While rotating each of the media prepared in Examples 29 and 30 at 3,600 rpm, tissue paper dipped in isopropyl alcohol (IPA) was pressed to the disk with a sufficient finger pressure for about 30 seconds. Then, the tissue paper was moved several times across the recorded surface and the resultant medium was air-dried. The coefficients of friction were evaluated in substantially the same manner as in Example 29. The results are shown in Table 11.

TABLE 11

| | Coefficient of friction | |
|---|---|---|
| Sample | initial stage | after IPA wipe |
| PTR(intrinsic viscosity 0.126 dl/g) | 0.2 | 0.2 |
| PTR(intrinsic viscosity 0.308 dl/g) | 0.2 | 0.2 |
| PIA(intrinsic viscosity 0.112 dl/g) | 0.2 | 0.2 |
| PIA(intrinsic viscosity 0.215 dl/g) | 0.2 | 0.2 |
| 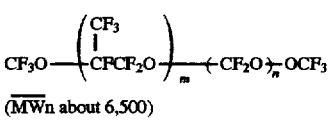 ($\overline{\text{MWn}}$ about 6,500) | 0.2 | 0.5 |

As apparent from the results of Examples 29 to 31, PIA and PTR having specific viscosities are useful as a lubricant for a magnetic recording material.

EXAMPLE 32

As evaluated by means of a Brookfield viscometer, the terminal-stabilized HFPO oligomer having a number average molecular weight of about 8,000 exhibits a sufficient viscosity, such as 800 cst, at 30° C. However, the viscosity is extremely low at high temperatures, e.g., 6 cst at 200° C. and 3 cst at 260° C. Such viscosities are insufficient for use as a lubricant.

13.0 g of the above-mentioned HFPO oligomer and 7.0 g of PTR being waxy at about room temperature and having an intrinsic viscosity of 0.160 dl/g, which was obtained in substantially the same manner as in Example 19, were dissolved in 100 g of perfluorohexane and then, the perfluorohexane was removed by means of an evaporator, to thereby obtain a colorless, transparent homogeneous highly viscous liquid composition.

The viscosities of the resultant composition were 23.4 cst at 200° C. and 10.3 cst at 260° C., providing a substantial improvement in the viscosity at high temperatures.

EXAMPLE 33

Using the terminal-stabilized HFPO oligomer (hereinafter referred to simply as "(A)") having a number average molecular weight of about 8,000, which was used in Example 32, the PTR having an intrinsic viscosity of 0.160 dl/g (hereinafter referred to simply as "(B)"), fine particulate polytetrafluoroethylene (which is dispersed in F-113) (hereinafter referred to simply as "C") and the PTR having an intrinsic viscosity of 0.315 dl/g (hereinafter referred to simply as "D"), which was synthesized in the same manner as in Example 18, three types of grease having formulations shown in Table 12 were prepared. The degrees of oil separation were measured at high temperatures, and it was found that the viscosity increase of base oil due to the addition of the PTR exhibited a marked effect of suppressing the oil separation.

TABLE 12

| formulation of grease (weight ratio) | Degree of oil separation | |
|---|---|---|
| | 200° C. × 40 hours | 300° C. × 2 hours |
| (A)/(B)/(C) = 20/0/4 | 11% | 26% |
| (A)/(B)/(C) = 13/7/4 | 4% | 12% |

TABLE 12-continued

| formulation of grease (weight ratio) | Degree of oil separation | |
|---|---|---|
| | 200° C. × 40 hours | 300° C. × 2 hours |
| (A)/(D)/(C) = 15/5/4 | 2% | 7% |

EXAMPLE 34

10 g of the PIA obtained in Example 3 was dissolved in 40 g of 2H-tetradecafluoro-5-(trifluoromethyl)-3,6-dioxanonane and cooled to 0° C., followed by reaction in an atmosphere of ammonia for 24 hours. Then, low boiling point components were removed by means of an evaporator, to thereby obtain a PIA, both terminal groups of which have been converted to amidine groups.

The thus obtained PIA having both terminal groups thereof converted to amidine groups, was again dissolved in 40 g of 2H-tetradecafluoro-5-(trifluoromethyl)-3,6-dioxanonane and then, to the resultant mixture was added 1 g of

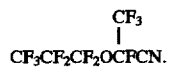

Stirring was conducted at 40° C. for 36 hours. Then, low boiling point components were removed by means of an evaporator, to thereby obtain 9.8 g of a PIA. It is believed that the PIA has a structure of

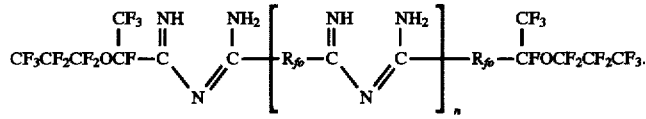

Using the resultant PIA, a PTR was synthesized in substantially the same manner as in Example 17, except that 10.0 g of

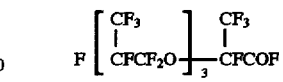

was used instead of 40 g of trifluoroacetic anhydride.

Thus, there was obtained a terminal-stabilized PTR having an intrinsic viscosity of 0.309 dl/g. It is believed that the PTR has a structure of

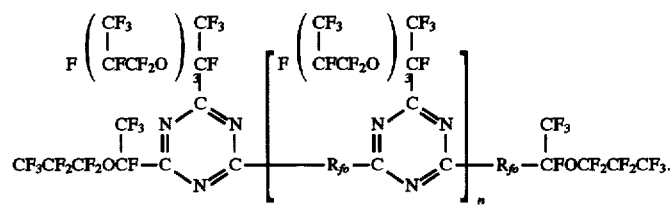

EXAMPLE 35

Synthesis of a PIA was conducted in a molar ratio (of $R_{fo}(CN)_2$ to be reacted with $DA_1$ to $R_{fo}(CN)_2$ used in the synthesis of $DA_1$) of 0.90 in substantially the same manner as in Example 2. As a result, a PIA having an intrinsic viscosity of 0.178 dl/g was obtained. That is, the thus obtained PIA had almost the same viscosity as that of the PIA obtained in Example 1 in which the same molar ratio as mentioned above was used.

In the above-mentioned molar ratio, the amount of the $R_{fo}(CN)_2$ is in excess of the molar ratio (0.86) at which the PIA having the highest viscosity can be produced. Therefore, it is believed that most of the terminal groups of the PIA have been converted to terminal nitrile groups.

20 g of the above-mentioned PIA and 2.0 g of monofunctional amidine

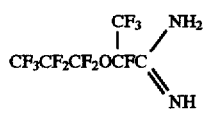

obtained by reacting

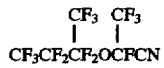

with liquid ammonia at −30° C. were dissolved in 20 g of F-113, and reacted at 40° C. for 20 hours. To the resultant reaction mixture was added diethyl ether to precipitate a polymer. The precipitated polymer was separated and washed with diethyl ether. A low boiling point component was removed from the polymer by means of an evaporator, to thereby obtain 19.9 g of a PIA. It is believed that the PIA has a structure represented by the following formula:

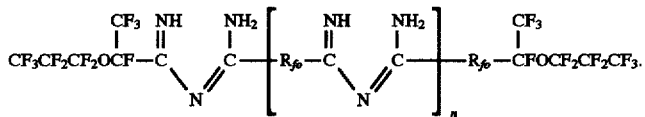

The thus obtained PIA was converted to a triazine in substantially the same manner as in Example 34, to thereby obtain a terminal-stabilized PTR.

EXAMPLE 36

With respect to the PTR obtained in Example 18 and the terminal-stabilized PTR's obtained in Examples 34 and 35, the weight decrease rates under heating conditions were determined by means of a thermobalance in air. The results are shown in Table 13.

From the results of Table 13, it is apparent that by the treatment for terminal stabilization in Examples 34 and 35, the thermal stabilities of the PTR's have been remarkably improved.

TABLE 13

| Sample | Weight decrease rate | |
|---|---|---|
| | 330° C. | 370° C. |
| PTR obtained in Example 18 | 0.04 weight %/min | 0.12 weight %/min |
| Terminal-stabilized PTR obtained in Example 34 | 0.01 weight %/min or less | 0.02 weight %/min |
| Terminal-stabilized PTR obtained in Example 35 | 0.01 weight %/min or less | 0.03 weight %/min |

EXAMPLE 37

Each of a PTR having an intrinsic viscosity of 0.160 dl/g, which was synthesized in substantially the same manner as in Example 19 and a PTR having an intrinsic viscosity of 0.130 dl/g, which was synthesized in substantially the same manner as in Example 20, was heated at 250° C. in air for 30 days. As a result, it was found that the appearances and the infrared absorption spectra of these PTR's were not changed at all before and after heating, and that with respect to each of these PTR's, the weight difference was 1% by weight or less and the intrinsic viscosity was also unchanged.

EXAMPLE 38

Between a stainless steel-made fixed cylinder having an outside diameter of 40 mm and a stainless steel-made cylinder having an inside diameter of 30 mm which were concentrically disposed (clearance: 1 mm), two types of PTR's as used in Example 37 were individually charged. Then, the outside cylinder was rotated at 500 rpm at 250° C. (shear rate: $1000S^{-1}$). The generated stress was determined by means of a torque gauge disposed on the inside cylinder.

With respect to the PTR's before and after heating disclosed in Example 37, the generated stresses were determined in the same manner as mentioned above. As a result, it was found that the generated stresses of both the PTR's were not changed at all before and after heating. Therefore, it was confirmed that the above-mentioned PTR's can maintain stabilized torque transmitting properties for a prolonged period of time at a temperature as high as 250° C.

On the other hand, when each of commercially available dimethyl silicone oils respectively having viscosities of 10,000 centistokes and 100,000 centistokes at 25° C. was heated at 250° C. in air for 10 days, both of the oils were gelated and, therefore, could no longer be used as a torque transmitting oil.

EXAMPLE 39

The chemical stability of a PTR having an intrinsic viscosity of 0.315 dl/g, which was synthesized in substantially the same manner as in Example 18, was determined under the following conditions. As a result, it was found that under any of the conditions, the appearance, infrared absorption spectrum and intrinsic viscosity of the PTR were not changed at all.

Conditions for determining chemical stability (*)

Aqueous NaOCl solution (effective concentration of chlorine: 12%): 30° C., 20 hours Aqueous $H_2O_2$ solution (35% by weight): 60° C., 20 hours $CH_3CO_2H$: 60° C., 20 hours $H_2SO_4$(97%): 150° C., 20 hours Aqueous NaOH solution (12% by weight): 60° C., 20 hours Pyridine : 60° C., 20 hours Aniline : 60° C., 20 hours

[(*): PTR/liquid for evaluation=1/100 (weight ratio)]

EXAMPLE 40

Using each of a perfluorohexane solution [hereinafter referred to as "PIA solution (1)"] containing 1% by weight of the PIA obtained in Example 4 which had an intrinsic viscosity of 0.511 dl/g, an F-113 solution [hereinafter referred to as "PIA solution (2)"] containing 1% by weight of the PIA obtained in Example 1 which had an intrinsic viscosity of 0.151 dl/g, and a perfluorohexane solution [hereinafter referred to as "Krytox solution"] containing 1% by weight of a commercially available terminal-stabilized HFPO oligomer (Krytox® 143AD (number average molecular weight: 8,250), manufactured by E. I. Du Pont De Nemours And Company, U.S.A.), the surface of a cover glass to be used for microscopic measurement was treated by the following methods.

(i) In each of the above-mentioned three types of solutions, a cover glass was immersed for 10 minutes and then, taken out from the solution and allowed to stand in an oven of 100° for 30 minutes. Subsequently, a droplet of water was dropped on each of the resultant three types of surface treated cover glasses and a non-surface treated cover glass, and the contact angle of each of the droplets on the surfaces of the glasses was determined.

As a result, it was found that whereas both of the sample of the non-surface treated glass and the sample of the glass treated with Krytox solution exhibited a droplet contact angle of 20° or less, both the samples of the glass treated with PIA solution (1) and the glass treated with PIA solution (2) exhibited a droplet contact angle of about 90°.

(ii) A cover glass was immersed in PIA solution (1) for 10 minutes and then, taken out from the solution and the surface of the cover glass was immediately washed with a large amount of perfluorohexane. Subsequently, the resultant cover glass was allowed to stand at room temperature for 30 minutes to thereby remove the solvent. On the resultant sample, a droplet of water was dropped, and the contact angle of the droplet on the surface of the glass was determined. As a result, it was found to be about 90°. Further, on the surface of this sample, methanol was dropped. As a result, it was found that the droplet of methanol was maintained on the surface of the glass. By contrast, on the surface of the non-surface treated glass, immediately after methanol was dropped, the methanol was diffused on the surface of the glass, thereby causing no droplet of methanol to be formed thereon.

From the above results, it has been confirmed that by the treatment with PIA's, a surface having a high water repellency and a high methanol repellency is formed.

EXAMPLE 41

In each of PIA solution (1), PIA solution (2) and Krytox solution as used in Example 40, an aluminum plate was immersed for 10 minutes and then, allowed to stand in an oven of 100° C. for 10 minutes.

Subsequently, on each of the surfaces of the resultant three types of surface treated aluminum plates and a non-surface treated aluminum plate, n-octane was dropped and observation was made with respect to formation of a droplet.

As a result, on the non-surface treated sample and the sample treated with Krytox solution, n-octane was diffused on the surface of the aluminum plate immediately after n-octane was dropped and no droplet of n-octane was formed. On the other hand, on the aluminum plates respectively treated with PIA solution (1) and PIA solution (2), a droplet of n-octane was formed on the surface of the aluminum plate. When the aluminum plate was inclined, the droplet slid down on the surface of the aluminum plate.

From the above results, it has been confirmed that by the treatment with the PIA, a surface having a high oil repellency is formed on the surface of the aluminum plate.

EXAMPLE 42

In each of PIA solution (1), PIA solution (2) and Krytox solution as used in Example 40, a brass plate was immersed for 30 minutes and then, allowed to stand in an oven of 100° C. for 30 minutes.

Subsequently, on each of the surfaces of the resultant three types of surface treated brass plates and a non-surface treated brass plate, an aqueous solution containing 30% by weight nitric acid was dropped, and the surface of each brass plate was observed.

On the sample of the non-surface treated brass plate and the sample of the brass plate treated with Krytox solution, bubbles were vigorously generated at the portion where the aqueous nitric acid solution was dropped, immediately after the aqueous nitric acid solution was dropped. The surfaces of the brass plates were corroded and the color of the aqueous nitric acid solution was changed from colorless to green. On the other hand, on the sample treated with PIA solution (1), a droplet was formed on the surface of the brass plate and the droplet was unchanged for 15 minutes after the dropping. However, 15 minutes later, bubbles began to be gradually generated. Meanwhile, on the sample treated with PIA solution (2), bubbles began to be gradually generated 6 minutes after the aqueous nitric acid solution was dropped.

From the above results, it has been confirmed that by the treatment with the PIA, a surface having a resistance to corrosion was formed on the surface of the brass plate.

EXAMPLE 43

To PIA solution (2) as used in Example 40 were added fine particles of aluminum chromate having a particle diameter of 10 μm, and agitated at 30° C. for 30 minutes. Then, the particles of aluminum chromate were filtered off and dried at 80° C. for 30 minutes.

When the thus treated fine particles of aluminum chromate were slowly dropped on the surface of water, a major portion of the particles floated on the surface of water. On the other hand, untreated fine particles of aluminum chromate submerged under water immediately after the fine particles were dropped on the surface of the water. The results show that by the PIA treatment, a PIA layer is formed on the surface of the particles of aluminum chromate, to thereby exhibit a high water repellency, so that the particles of the aluminum chromate were floated on the surface of the water by the surface tension.

The above-mentioned fine particles of PIA-treated aluminum chromate and the untreated fine particles of aluminum chromate were dispersed in a silicone oil and allowed to stand still for one week. Then, the redispersibilities of the precipitated particles were examined. As a result, it was found that the PIA-treated fine particles exhibited much higher redispersibilities than those of the untreated fine particles.

EXAMPLE 44

$R_{fo}(CN)_2[A]$ obtained in Synthetic Example 8 was used in this Example.

20 g of ammonia and 30 ml of F-113 were charged in a pressure reactor vessel having an inner volume of 200 ml, and cooled to $-15°$ C.

While agitating the contents of the reactor vessel, a solution prepared by dissolving 30.0 g of the above-mentioned $R_{fo}(CN)_2[A]$ in 60 g of F-113 was added thereto at a flow rate of 20 ml/hr by means of a quantitative pump. Thereafter, agitation was conducted for 2 hour at $-15°$ C. and for 15 hours at room temperature.

In the reaction solution, a small amount of suspended matter was observed. Therefore, the reaction solution was filtered by means of a filter paper and then the solvent was removed by means of an evaporator while heating at 60° C. As a result, a viscous substance was obtained in an amount (29.8 g) which is substantially the same as that of the charged $R_{fo}(CN)_2[A]$.

The viscous substance was subjected to infrared absorption spectroscopy. In the spectrum, a characteristic absorption band at 2,275 $cm^{-1}$ attributed to a nitrile group disappeared and a strong characteristic absorption band attributed to an amidine group was observed at 1,700 $cm^{-1}$.

In the $^{19}$F-NMR spectrum as well of the viscous substance, the disappearance of a nitrile group and the formation of an amidine group were confirmed. Further, small amounts of groups other than an amidine group were also observed.

Subsequently, 4.0 g of the viscous substance (hereinafter referred to simply as $DA'_1$), which was believed to comprise a diamidine as a principal component, and $R_{fo}(CN)_2[A]$ were added in charge ratios as indicated in Table 13, and dissolved in 50 ml of F-113. The F-113 was completely removed by means of an evaporator, and the resultant transparent homogenous mixture of $DA'_1$ and $R_{fo}(CN)_2[A]$ was allowed to stand still at 40° C. for 30 hours. As a result, as shown in Table 14, various polymers were formed, which had respective intrinsic viscosities dependent on the charge ratio of $DA'_1$ to $R_{fo}(CN)_2[A]$.

TABLE 14

| No. of moles of $R_{fo}(CN)_2[A]$ to be reacted with 4 g of $DA'_1$/No. of moles of $R_{fo}(CN)_2[A]$ used in the synthesis of 4 g of $DA'_1$ | Intrinsic viscosity of PIA (dl/g) (*1) |
| --- | --- |
| 0.70 | 0.139 |
| 0.80 | 0.230 |
| 0.88 | 0.513 (*2) |
| 0.91 | 0.310 |
| 0.97 | 0.127 |

(*1) in F-113, 30° C. by Ostwald's viscometer
(*2) in tetradecafluoro-5-(trilfluoromethyl)-3,6-dioxanonane, 50° C. by Ostwald's viscometer The formed polymers were subjected to infrared absorption spectroscopy. In all of the polymers, strong characteristic absorption bands attributed to an imidoylamidine band were observed at 1,600 $cm^{-1}$ and 1,660 $cm^{-1}$, whereby formation of a PIA was confirmed.

PIA's having an intrinsic viscosity of from about 0.3 to about 0.5 dl/g were an elastic solid exhibiting substantially no fluidity at about room temperature. PIA's having an intrinsic viscosity of from about 0.12 to about 0.13 dl/g were a waxy substance exhibiting a slight fluidity at about room temperature.

EXAMPLE 45

$R_{fo}(CN)_2[B]$ obtained in Synthetic Example 9 was used in this Example.

50 g of $R_{fo}(CN)_2[B]$, 50.0 g of perfluorohexane and a rotor was put in a round bottom flask having an inner volume of 300 ml, and cooled to $-40°$ C. Subsequently, about 10 g of ammonia was condensed in the flask, and a reaction was performed at $-40°$ C. for about 1 hour. Thereafter, the temperature of the reaction mixture was elevated to about room temperature over a period of about 1 hour, and agitation was further continued for 1 hour.

From the contents of the flask, low boiling point components were evaporated by means of an evaporator, thereby obtaining a viscous substance (hereinafter referred to simply as $DA'_2$) comprising a diamidine as a principal component.

The whole quantity of the resultant $DA'_2$ and 43.0 g of $R_{fo}(CN)_2[B]$ were dissolved in 200 ml of perfluorohexane, and then the perflouorohexane was completely removed by means of an evaporator, thereby obtaining a transparent homogeneous mixture of $DA'_2$ and $R_{fo}(CN)_2[B]$. The mixture was allowed to stand still at 40° C. for 55 hours. As a result, a transparent elastic solid exhibiting no fluidity at about room temperature was obtained.

The intrinsic viscosity of the elastic solid PIA as measured in perfluorooctane at 40° C. by means of an Ostwald viscometer was 0.385 dl/g.

EXAMPLE 46

$R_{fo}(CN)_2[C]$ obtained in Synthetic Example 10 was used in this Example.

A viscous substance (hereinafter referred to simply as $DA'_3$) comprising a diamidine as a principal component, was obtained by performing the treatment with ammonia according to substantially the same procedure as described in Example 45.

10.0 g of $DA'_3$ and 8.20 g of the above-mentioned highly purified $R_{fo}(CN)_2[C]$ were dissolved in 50 ml of perfluorohexane, and the perfluorohexane was completely removed by means of an evaporator, thereby obtaining a transparent homogeneous mixture of $DA'_3$ and $R_{fo}(CN)_2[C]$. The mixture was allowed to stand still at 40° C. for 50 hours, thereby obtaining an elastic solid exhibiting no fluidity at about room temperature.

The intrinsic viscosity at 50° C. of the elastic solid PIA in 2H-tetradecafluoro-5-(trifluoromethyl)-3,6-dioxanonane was 0.312 dl/g.

EXAMPLE 47

From the PIA having an intrinsic viscosity of 0.513 dl/g which was obtained in Example 44, a PTR was synthesized according to the following procedure.

A solution prepared by dissolving 3.0 g of PIA in 50 ml of 2H-tetradecafluoro-5-(trifluoromethyl)-3,6-dioxanonane and 5.0 g of trifluoroacetic anhydride were charged into a polyethylene vessel provided with a lid and having an inner volume of 200 ml, and agitated at 40° C. for 30 hours.

Subsequently, 100 ml of diethyl ether was gradually dropwise added to the resultant reaction mixture, thereby causing a polymer to be precipitated. The whole amount of the polymer was dissolved in 50 ml of 2H-tetradecafluoro-5-(trifluoromethyl)-3,6-dioxanonane, and then 100 ml of diethyl ether was added, thereby causing a polymer to be reprecipitated. From the resultant precipitate, low boiling point components were completely removed by means of an evaporator. As a result, 2.78 g of a transparent, elastic solid polymer was obtained.

In the infrared absorption spectrum of the elastic solid, characteristic absorption bands at 1600 cm$^{-1}$ and 1660 cm$^{-1}$, which are attributed to a polyimidoylamidine, disappeared, and a sharp characteristic absorption band attributed to a triazine ring was observed at 1560 cm$^{-1}$. From the above, it was confirmed that by the above procedure, the conversion from the PIA to a PTR was carried out.

The intrinsic viscosity of the resultant PTR was 0.540 dl/g.

The PTR was substantially insoluble in organic solvents, such as toluene, octane, petroleum ether, ethyl ether, ethyl acetate, acetone, carbon tetrachloride, methanol and tetrahydrofuran, exhibiting high solvent resistance.

The PTR was contacted with a plastic, such as polyacetal, 6-nylon, polyethylene, polycarbonate and polytetrafluoroethylene, and heated at 70° C. for one week. Despite such a heating, the plastics did not substantially undergo any dimensional change or weight change. From the above, the excellent compatibility of the PTR with various types of plastics was confirmed.

EXAMPLE 48

From the PIA having an intrinsic viscosity of 0.312 dl/g which was obtained in Example 46, a PTR was synthesized according to substantially the same reaction as described in Example 47, except that 20.0 g of

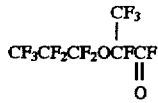

was used in place of 5.0 g of trifluoroacetic anhydride, and that with respect to the reaction conditions, a heating at 80° C. for 24 hours was carried out in place of the heating at 40° C. for 30 hours.

As a result, 2.93 g of a transparent, elastic solid PTR having an intrinsic viscosity of 0.337 dl/g was obtained.

This PTR exhibited the same high solvent resistance and compatibility with various types of plastics as those of the PTR obtained in Example 47.

EXAMPLE 49

From the PIA having an intrinsic viscosity of 0.139 dl/g obtained in Example 44, a PTR was synthesized according to substantially the same reaction as described in Example 47, except that 20.0 g of

was used in place of 5.0 g of trifluoroacetic anhydride, that perfluorohexane was used in place of 2H-tetradecafluoro-5-(trifluoromethyl)-3,6-dioxanonane, and that with respect to the reaction conditions a heating at 60° C. for 45 hours was carried out in place of the heating at 40° C. for 30 hours.

As a result, 2.98 g of a transparent waxy PTR having an intrinsic viscosity of 0.147 dl/g was obtained. This PTR as well exhibited the same high solvent resistance and compatibility with various types of plastics as those of the PTR obtained in Example 47.

EXAMPLE 50

With respect to a terminal-stabilized HFPO oligomer having a number average molecular weight of about 8,000 and represented by the following formula:

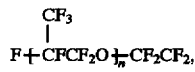

the viscosity measured at 30° C. by means of a Brookfield rotational viscometer was satisfactorily as high as 800 cst. However, the viscosity was decreased to 6 cst at 200° C. and 3 cst at 260° C. indicating that the viscosity at high temperatures becomes extremely low, so that this HFPO oligomer cannot be advantageously used as a lubricant at high temperatures.

When 13.0 g of this HFPO oligomer and 7.0 g of PTR (waxy at about room temperature) having an intrinsic viscosity of 0.158 dl/g (this PTR was obtained in substantially the same manner as in Example 49) were dissolved in 100 g of perfluorohexane and then, the perfluorohexane was removed by means of an evaporator, to thereby obtain a colorless, transparent, homogeneous liquid composion having high visosity.

This composition showed viscosities of 21.9 cst at 200° C. and 9.3 cst at 260° C., indicating a considerable improvement in viscosity at high temperatures.

EXAMPLE 51

Using the terminal-stabilized HFPO oligomer (hereinafter referred to simply as "(A)") having a number average molecular weight of about 8,000, the PTR having an intrinsic viscosity of 0.160 dl/g (hereinafter referred to simply as "(B)"), both of which were used in Example 50, and fine particulate polytetrafluoroethylene (which is dispersed in F-113) (hereinafter referred to simply as "C"), two types of grease having formulations shown in Table 15 were prepared. The degrees of oil separation were measured at high temperatures, and it was found that the viscosity increase of base oil due to the addition of the PTR exhibited a marked effect of suppressing the oil separation.

TABLE 15

| formulation of grease (weight ratio) | Degree of oil separation 200° C. × 40 hours |
|---|---|
| (A)/(B)/(C) = 20/0/4 | 12% |
| (A)/(B)/(C) = 13/7/4 | 3% |

As described above each of the high molecular weight polyimidoilamidine (PIA) of the present invention and the high molecular weight polytriazine (PTR) derived therefrom has a high viscosity due to the high molecular weight thereof, as compared to the conventional low molecular weight PIA and PTR. In addition, the PTR of the present invention has excellent resistance to chemicals and excellent heat resistance. Therefore, various applications which have not been considered with respect to the conventional PIA and PTR can be expected for the PIA and PTR of the present invention. Further, various high molecular weight PTR's having a high stability can readily be obtained from the high molecular weight PIA. Of these PTR's, PTR's having a particularly high molecular weight are a solid substance, which is useful as a chemically stable structural material. Moreover, PIA's having an intrinsic viscosity which is within a specific range are useful as a lubricant for a magnetic recording material or as a surface treating agent for a metallic material or an inorganic material, such as ceramics. Still further, PTR's having an intrinsic viscosity which is within a specific range are useful as a viscosity modifier for a fluoro-oil or fluoro-grease comprising a perfluoropolyether, as a lubricant usable under high temperature and/or high vacuum conditions, as a lubricant for a magnetic recording material, or as a highly stable, torque transmitting oil.

It has also been found that a polytriazine, which contains nitrile group at side chains thereof and has an intrinsic viscosity within a specific range, is suitable as a precursor of a perfluoroelastomer having excellent mechanical and chemical properties.

EXAMPLE 52

(1) Synthesis of polytriazine having pendant nitrile groups (hereinafter referred to simply as "prepolymer")

Using PIA having an intrinsic viscosity of 0.450 dl/g (which had been prepared in substantially the same manner as in Example 4, substantially the same reactions were conducted except that various acylating agents, which are represented by formulae ($AC_1$) and ($AC_2$),

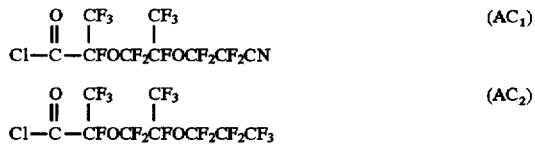

were used individually or in combination in different ratios, to thereby obtain various prepolymers represented by the following formula (III"):

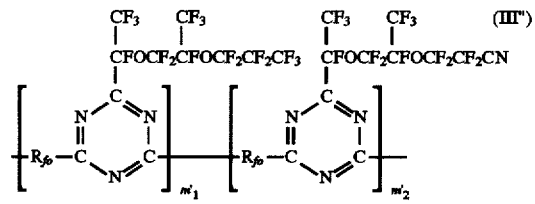

wherein $R_{fp}$ is a bivalent perfluoropolyether chain having a number average molecular weight of about 5,000, which is derived from HFPO, and $m'_1$ and $m'_2$ are as indicated below.

In the above reactions, the $AC_1/AC_2$ ratio was varied to obtain various types of colorless, transparent prepolymer, [$PR_1$]–[$PR_5$], having various number average molecular weights per nitrile group. The obtained prepolymers each exhibit an absorption characteristic of pendant nitrile groups at 2,260 $cm^{-1}$ in an infrared absorption spectrum.

The properties of the obtained prepolymer are shown in Table 16.

TABLE 16

| Sample No. | $m'_1/m'_2$ | Number average molecular weight per nitrile group |
|---|---|---|
| [$PR_1$] | 0 | about 5,500 |
| [$PR_2$] | 0.7 | about 9,400 |
| [$PR_3$] | 3.6 | about 25,000 |
| [$PR_4$] | 6.2 | about 40,000 |
| [$PR_5$] | 11.3 | about 68,000 |

(2) Crosslinking of Prepolymer

Prepolymers [$PR_1$], [$PR_2$], [$PR_3$], [$PR_4$] and [$PR_5$] were individually filled between two glass plates, which are arranged in parallel at intervals of 1 mm, using a spacer made of polytetrafluoroethylene. These prepolymers as filled above were heated at 200° C. for 20 hours in an atmosphere of ammonia gas under an atmospheric pressure and then, further heated at 200° C. for 10 hours in an atmosphere of argon gas under an atmospheric pressure.

As a result, from the above-mentioned prepolymers were obtained 1 mm-thick, colorless, transparent crosslinked polymers each being insoluble in various types of fluoro-solvents.

These crosslinked polymers showed a weight decrease of only less than 3% even upon heating at 300° C. for 200 hours in the air, exhibiting a high thermal stability. However, the mechanical properties very depending on the type of crosslinked polymer, and two types of crosslinked polymers, which are obtained from [$PR_1$] and [$PR_2$], were brittle, so that these two types crosslinked polymers are not suitable for use as elastomer.

The mechanical properties of the obtained crosslinked polymers are summarized in Table 17.

TABLE 17

| Cross linked polymer | Properties |
|---|---|
| [$PR_1$]-derived | Brittle |
| [$PR_2$]-derived | Somewhat elastic, but brittle |
| [$PR_3$]-derived | Soft and elastic |
| [$PR_4$]-derived | " |
| [$PR_5$]-derived | " |

With respect to the sample sheet of crosslinked polymer obtained from [$PR_4$], the temperature dependency of the value of Tan δ was measured by means of a kinematic viscoelasticity measuring apparatus, Rheovibron® (trade mark of the apparatus produced by Orientech, Japan), to obtain results indicating that the glass transition temperature is −45° C.

Further, even when this sample sheet was immersed in concentrated sulfuric acid at 150° C. for 300 hours, only small weight change (1.7%) was observed.

EXAMPLE 53

A mixture of 5 g of prepolymer [PR₄] as obtained in Example 52, 5 g of perfluorooctane and 5 g tetraallyltin was kneaded by hand at room temperature and, subsequently, the perfluorooctane was removed by distillation. The resultant composition was heated at 160° C. for 10 days in a nitrogen gas atmosphere to obtain a crosslinked polymer which is insoluble in fluoro-solvents.

EXAMPLE 54

A mixture of 5 g of prepolymer [PR₄] as obtained in Example 52, 1 g of graphite fluoride represented by formula (CF₂), produced and sold by Central Glass Co., Ltd., Japan, and 5 g of perfluorooctane was kneaded by hand at room temperature and, subsequently, the perfluorooctane was removed by distillation. The resultant composition was subjected to a crosslinking reaction in substantially the same manner as described under item (2) of Example 52 except that the temperature and time for heating in a nitrogen gas atmosphere were changed to 150° C. and 50 hours, to thereby obtain a grayish elastomer composition which is insoluble in fluoro-solvents.

The measurement of the mechanical properties of this elastomer composition by means of Instron tester showed that the elastomer had a strength at break was 12.4 kg/cm² and an elongation at break was 910%. The Shore A hardness was 12.2.

This elastomer composition showed a high resistance to heat and acid which is substantially the same as that of the crosslinked polymer obtained from prepolymer [PR₄] of Example 52. However, with respect to alkali resistance, this elastomer composition was much improved as compared to the [PR₄]-derived crosslinked polymer. Illustratively stated, when 1 mm-thick sample sheets of the [PR₄]-derived crosslinked polymer and this elastomer composition were individually immersed in a 10% aqueous NaOH solution for 30 hours, the [PR₄]-derived crosslinked polymer alone showed a weight decrease of 2.3% and a length decrease of 1.0% whereas this elastomer composition of [PR₄]-derived crosslinked polymer/(CF)ₙ system showed a weight decrease of only 0.4% and a length decrease of zero.

What is claimed is:

1. A method for preparing a polyimidoylamidine comprising recurring units of the following formula:

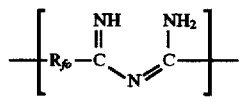

wherein $R_{f_0}$ is a bivalent perfluoropolyether chain represented by the following formula:

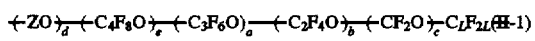

in which Z is a perfluoroalkylene group having from 2 to 20 carbon atoms or a bivalent perfluoroether residue having from 4 to 25 carbon atoms, a, b, c and e are each 0 or a positive integer where $2 \leq a+b+c+e \leq 300$, d is 0 or 1, and L is 1, 2 or 3, and in which the arrangement of (ZO), (C₄F₈O), (C₃F₆O), (C₂F₄O) and (CF₂O) units is arbitrarily selected, said bivalent chain (II-1) having a number average molecular weight of from 1×10³ to 5×10⁴, with the proviso that said units of formula (I) are the same or different, which comprises:

(a) reacting a perfluoropolyether dinitrile (α) represented by the following formula:

$$R_{f_0}(CN)_2 \qquad (II)$$

wherein $R_{f_0}$ is as defined above, said dinitrile (α) having a number average molecular weight of from about 1×10³ to about 5×10⁴ and a bifunctionality of at least 95 mole %, with ammonia in a molar ratio of said ammonia to said dinitrile (α) of at least 5, and (b) reacting the resultant reaction product with a perfluoropolyether dinitrile (β) represented by said formula (II), said dinitrile (β) having a number average molecular weight of from about 1×10³ to about 5×10⁴ and a bifunctionality of at least 95 mole % and being employed in a molar ratio of from 0.60 to 0.99 relative to said dinitrile (α), wherein said dinitriles (α) and (β) are the same or different.

2. The method according to claim 1, wherein each of said dinitriles (α) and (β) is obtained by a method comprising:

(1) polymerizing hexafluoropropylene oxide by the use of a bifunctional polymerization initiator represented by the following formula:

$$\text{MO—A''—OM}$$

wherein A" is a perfluoroalkylene group having from 2 to 20 carbon atoms or a bivalent perfluoroether residue having from 4 to 25 carbon atoms, and M is an alkali metal atom, to obtain a mixture of a bifunctional hexafluoropropylene oxide oligomer having a number average molecular weight of from 1,000 to 15,000 and represented by the following formula:

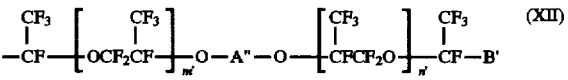

wherein A" is as defined above, m' and n' are each a positive integer, and B' is

or —CF₂OM, where M is as defined above and a monofunctional hexafluoropropylene oxide oligomer having a number average molecular weight of from 500 to 15,000 and represented by the following formula:

wherein B' is as defined above and l is a positive integer, (2) converting the terminal groups of said bifunctional and monofunctional hexafluoropropylene oxide oligomers to ester groups or nitrile groups, (3) subjecting the resultant mixture to distillation under reduced pressure at a temperature of from 80° to 450° C., so that 1 to 35% by weight of said resultant mixture is removed as an initial stage distillation fraction, wherein when the terminal groups of said bifunctional and monofunctional hexafluoropropylene oxide oligomers are converted to ester groups in step (2), the ester groups are converted to nitrile groups prior to step (3) or subsequent to step (3).

3. A method for preparing a polytriazine comprising recurring units of the following formula:

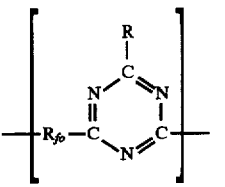
(III)

wherein R is a perfluoroalkyl group having from 1 to 15 carbon atoms or a perfluoroether group having from 2 to 100 carbon atoms, and $R_{fo}$ is a bivalent perfluoropolyether chain represented by the following formula:

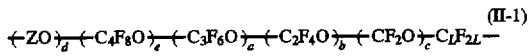
(II-1)

in which Z is a perfluoroalkylene group having from 2 to carbon atoms or a bivalent perfluoroether residue having from 4 to 25 carbon atoms, a, b, c and e are each or a positive integer where $2 \leq a+b+c+e \leq 300$, d is 0 or 1, and L is 1, 2 or 3, and in which the arrangement of (ZO), $(C_4F_8O)$, $(C_3F_6O)$, $(C_2F_4O)$ and $(CF_2O)$ units is arbitrarily selected, said bivalent chain (II-1) having a number average molecular weight of from $1 \times 10^3$ to $5 \times 10^4$, with the proviso that said units of formula (III) are the same or different, said polytriazine having an intrinsic viscosity of from 0.25 to 0.65 dl/g, wherein said intrinsic viscosity is measured at 40° C. in perfluorohexane, which comprises reacting a polyimidoylamidine comprising recurring units of the following formula:

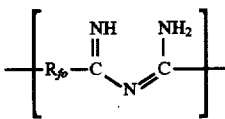
(I)

wherein $R_{fo}$ is as defined above, with the proviso that said units of formula (I) are the same or different, with an acylating agent containing or capable of forming substituent R, where R is as defined above, said polyimidoylamidine being obtained by the method of claim 2.

4. The method for preparing a polytriazine according to claim 3, wherein said polyimidoylamidine is a polyimidoylamidine having terminal groups comprised mainly of imidoylamidine groups which is obtained by a process (A), thereby providing a polytriazine having terminal groups comprised mainly of groups represented by $R^1$, where $R^1$ has the same meaning as defined for R of formula (III), exclusive of those which are substituted with a nitrile group, an ester group or a carboxyl group, said process (A) comprising reacting a monofunctional amidine compound of the following formula:

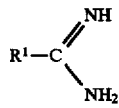
(XIX-2)

wherein $R^1$ is as defined above,
with a polyimidoylamidine (ii) having terminal groups comprised mainly of nitrile groups, to convert the terminal nitrile groups of said polyimidoylamidine (ii) to imidoylamidine groups, said polyimidoylamidine (ii) being obtained by method (1) which comprises:

(a) reacting a perfluoropolyether dinitrile ($\alpha$) represented by the following formula $$R_{fo}(CN)_2 \qquad (II)$$

wherein $R_{fo}$ is as defined above, said dinitrile ($\alpha$) having a number average molecular weight of from about $1 \times 10^3$ to about $5 \times 10^4$ and a bifunctionality of at least 95 mole %, with ammonia in a molar ratio of said ammonia to said dinitrile ($\alpha$) of at least 5, and (b) reacting the resultant reaction product with a perfluoropolyether dinitrile ($\beta$) represented by said formula (II), said dinitrile ($\beta$) having a number average molecular weight of from about $1 \times 10^3$ to about $5 \times 10^4$ and a bifunctionality of at least 95 mole % and being employed in a molar ratio of from 0.60 to 0.99 relative to said dinitrile ($\alpha$), wherein said dinitriles ($\alpha$) and ($\beta$) are the same or different.

5. The method according to claim 4, wherein said polyimidoylamidine has an intrinsic viscosity of from 0.25 to 0.60 dl/g.

6. The method according to claim 3, wherein said polyimidoylamidine has an intrinsic viscosity of from 0.25 to 0.60 dl/g.

7. The method for preparing a polytriazine according to claim 3, wherein said polyimidoylamidine is a polyimidoylamidine having terminal groups comprised mainly of imidoylamidine groups which is obtained by a process (B), thereby providing a polytriazine having terminal groups comprised mainly of groups represented by $R^1$, where $R^1$ has the same meaning as defined for R of formula (III), exclusive of those which are substituted with a nitrile group, an ester group or a carboxyl group, said process (B) comprising reacting a polyimidoylamidine (i) having terminal groups comprised mainly of amidine groups with a monofunctional nitrile compound of the following formula:

$$R^1\text{---}CN \qquad (XIX-1)$$

wherein $R^1$ is as defined above, to convert the terminal amidine groups of said polyimidoylamidine (i) to imidoylamidine groups, said polyimidoylamidine (i) being obtained by method (1) which comprises:

(a) reacting a perfluoropolyether dinitrile ($\alpha$) represented by the following formula:

$$R_{fo}(CN)_2 \qquad (II)$$

wherein $R_{fo}$ is as defined above, said dinitrile ($\alpha$) having a number average molecular weight of from about $1 \times 10^3$ to about $5 \times 10^4$ and a bifunctionality of at least 95 mole %, with ammonia in a molar ratio of said ammonia to said dinitrile ($\alpha$) of at least 5, and (b) reacting the resultant reaction product with a perfluoropolyether dinitrile ($\beta$) represented by said formula (II), said dinitrile ($\beta$) having a number average molecular weight of from about $1 \times 10^3$ to about $5 \times 10^4$ and a bifunctionality of at least 95 mole % and being employed in a molar ratio of from 0.60 to 0.99 relative to said dinitrile ($\alpha$), wherein said dinitriles ($\alpha$) and ($\beta$) are the same or different, or being obtained by method (1) which, when the product of method (1) is (ii) a polyimidoylamidine having terminal groups comprised mainly of nitrile groups, (iii) a polyimidoylamidine having terminal groups comprised mainly of nitrile groups and amidine groups or (iv) a mixture thereof, further comprises reacting said polyimidoylamidine (ii) or (iii), or said mixture (iv) with ammonia.

8. The method according to claim 7, wherein said polyimidoylamidine has an intrinsic viscosity of from 0.25 to 0.60 dl/g.

* * * * *

UNITED STATES PATENT AND TRADEMARK OFFICE
CERTIFICATE OF CORRECTION

PATENT NO. : 5,693,748
DATED : December 2, 1997
INVENTOR(S) : Masanori IKEDA et al.

It is certified that error appears in the above-identified patent and that said Letters Patent is hereby corrected as shown below:

On the Title Page:

Under Section [30] Foreign Application Priority Data, insert the following:

-- Feb. 1, 1989   [JP]   Japan ............... 1-20835 --

Signed and Sealed this

Twenty-first Day of July, 1998

Attest:

Attesting Officer

BRUCE LEHMAN

Commissioner of Patents and Trademarks